US012062481B2

(12) United States Patent
Kang et al.

(10) Patent No.: US 12,062,481 B2
(45) Date of Patent: Aug. 13, 2024

(54) COIL COMPONENT

(71) Applicant: SAMSUNG ELECTRO-MECHANICS CO., LTD., Suwon-si (KR)

(72) Inventors: Byung Soo Kang, Suwon-si (KR); Ju Hwan Yang, Suwon-si (KR); Yong Hui Li, Suwon-si (KR); Byeong Cheol Moon, Suwon-si (KR); Boum Seock Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 724 days.

(21) Appl. No.: 17/186,376

(22) Filed: Feb. 26, 2021

(65) Prior Publication Data

US 2022/0172883 A1 Jun. 2, 2022

(30) Foreign Application Priority Data

Nov. 27, 2020 (KR) ........................ 10-2020-0162897

(51) Int. Cl.

| | |
|---|---|
| ***H01F 5/00*** | (2006.01) |
| ***H01F 27/255*** | (2006.01) |
| ***H01F 27/28*** | (2006.01) |
| ***H01F 27/29*** | (2006.01) |
| ***H01F 27/32*** | (2006.01) |
| ***H01F 41/12*** | (2006.01) |

(52) U.S. Cl.

CPC ........... *H01F 27/29* (2013.01); *H01F 27/255* (2013.01); *H01F 27/2804* (2013.01); *H01F 27/32* (2013.01); *H01F 41/12* (2013.01); *H01F 2027/2809* (2013.01)

(58) Field of Classification Search

CPC ....................................................... H01F 27/29
USPC ......................................................... 336/200
See application file for complete search history.

(56) References Cited

U.S. PATENT DOCUMENTS

| | | | |
|---|---|---|---|
| 2013/0154780 A1* | 6/2013 | Yamada .................. | H01F 27/29 336/175 |
| 2018/0182537 A1* | 6/2018 | Shimizu .................. | H01F 27/29 |
| 2020/0118729 A1 | 4/2020 | Lim et al. | |

FOREIGN PATENT DOCUMENTS

| | | |
|---|---|---|
| KR | 10-2016-0040422 A | 4/2016 |
| KR | 10-2020-0041696 A | 4/2020 |

OTHER PUBLICATIONS

English translation of CN104916390 (Year: 2015).*

* cited by examiner

*Primary Examiner* — Ronald Hinson
(74) *Attorney, Agent, or Firm* — MORGAN, LEWIS & BOCKIUS LLP

(57) ABSTRACT

A coil component includes a body; a support substrate disposed in the body; a coil portion including a first coil pattern, a first lead-out pattern, and a second lead-out pattern; a first slit portion defined at a corner portion between the first end surface and the first surface, and a second slit portion defined at a corner portion between the second end surface and the first surface, the first and second slit portions exposing the first and second lead-out patterns; a first external electrode and a second external electrode spaced apart from each other on the first surface, and respectively extending onto the first and second slit portions to be connected to the first and second lead-out patterns; and a surface insulating layer disposed on the first and second slit portions to cover a portion of the first and second external electrodes and extending onto the first surface.

17 Claims, 16 Drawing Sheets

I-I'

COIL COMPONENT

CROSS-REFERENCE TO RELATED APPLICATION(S)

The present application claims the benefit of priority to Korean Patent Application No. 10-2020-0162897, filed on Nov. 27, 2020 in the Korean Intellectual Property Office, the entire disclosure of which is incorporated herein by reference.

TECHNICAL FIELD

The present disclosure relates to a coil component.

BACKGROUND

An inductor, a coil component, is a typical passive electronic component used in electronic devices, along with a resistor and a capacitor.

As electronic devices gradually gain higher levels of performance and become smaller, the number of electronic components used in electronic devices has increased while being miniaturized.

External electrodes of a coil component are typically formed on two surfaces of a body opposing each other in a length direction. In this case, an overall length or width of the coil component may be increased due to thicknesses of the external electrodes. When the coil component is mounted on a mounting board, the external electrodes of the coil component may be brought into contact with other components, disposed adjacent to the mounting board, to cause a short-circuit.

SUMMARY

An aspect of the present disclosure is to improve characteristics of a coil component.

Another aspect of the present disclosure is to easily form a lower-surface electrode structure of a coil component.

According to an aspect of the present disclosure, a coil component includes a body having a first surface, and a first end surface and a second end surface, each connected to the first surface of the body and opposing each other in a length direction; a support substrate disposed in the body; a coil portion including a first coil pattern, a first lead-out pattern, and a second lead-out pattern, each disposed on a first surface of the support substrate facing the first surface of the body; a first slit portion defined at a corner portion of the body between the first end surface and the first surface of the body, and a second slit portion defined at a corner portion of the body between the second end surface of the body and the first surface of the body, the first and second slit portions exposing the first and second lead-out patterns to an outside of the body; a first external electrode and a second external electrode disposed to be spaced apart from each other on the first surface of the body, and respectively extending onto the first and second slit portions to be connected to the first and second lead-out patterns; and a surface insulating layer disposed on each of the first and second slit portions to cover at least a portion of the first and second external electrodes and extending onto at least a portion of the first surface of the body.

According to another aspect of the present disclosure, a coil component includes a body having a first surface, and a first end surface and a second end surface, each connected to the first surface of the body and opposing each other in a length direction; a support substrate disposed in the body; a coil portion comprising a first coil pattern, a first lead-out pattern, and a second lead-out pattern, each disposed on a first surface of the support substrate facing the first surface of the body; a first slit portion defined at a corner portion of the body between the first end surface and the first surface of the body, and a second slit portion defined at a corner portion of the body between the second end surface of the body and the first surface of the body, the first and second slit portions respectively, wherein the first and second lead-out patterns have grooves sharing surfaces with internal surfaces of the first and second slit portions, respectively; a first external electrode and a second external electrode disposed to be spaced apart from each other on the first surface of the body, and respectively extending onto the first and second slit portions to be connected to the first and second lead-out patterns; and a surface insulating layer disposed on each of the first and second slit portions to cover at least a portion of the first and second external electrodes.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
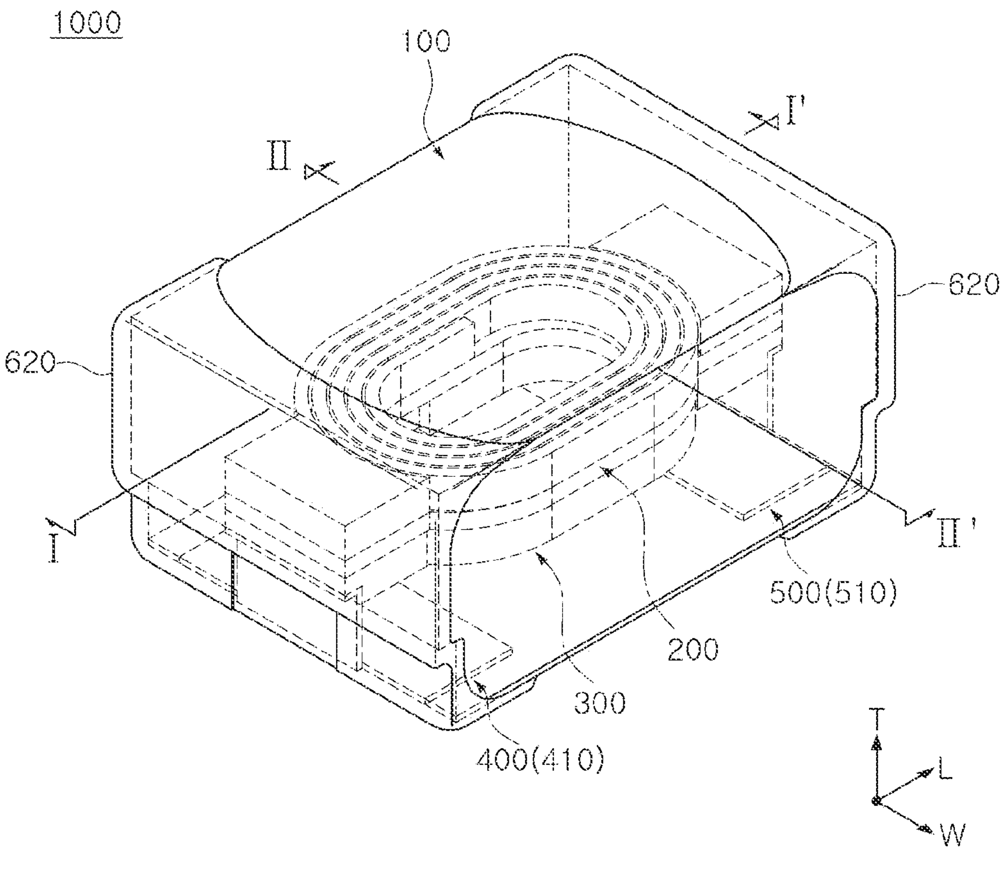
FIG. 1 is a schematic perspective view of a coil component according to a first embodiment of the present disclosure.

The terms used in the description of the present disclosure are used to describe a specific embodiment, and are not intended to limit the present disclosure. A singular term includes a plural form unless otherwise indicated. The terms “include,” “comprise,” “is configured to,” etc. of the description of the present disclosure are used to indicate the presence of features, numbers, steps, operations, elements, parts, or combination thereof, and do not exclude the possibilities of combination or addition of one or more additional features, numbers, steps, operations, elements, parts, or combination thereof. Also, the terms "disposed on," "positioned on," and the like, may indicate that an element is positioned on or beneath an object, and does not necessarily mean that the element is positioned above the object with reference to a direction of gravity.

Terms such as "coupled to," "combined to," and the like, may not only indicate that elements are directly and physically in contact with each other, but also include the configuration in which another element is interposed between the elements such that the elements are also in contact with the other component.

Sizes and thicknesses of elements illustrated in the drawings are indicated as examples for ease of description, and the present disclosure are not limited thereto.

In the drawings, an L direction is a first direction or a length (longitudinal) direction, a W direction is a second direction or a width direction, a T direction is a third direction or a thickness direction.

Hereinafter, a coil component according to an exemplary embodiment of the present disclosure will be described in detail with reference to the accompanying drawings. Referring to the accompanying drawings, the same or corresponding components may be denoted by the same reference numerals, and overlapped descriptions will be omitted.

In electronic devices, various types of electronic components may be used, and various types of coil components may be used between the electronic components to remove noise, or for other purposes.

In other words, in electronic devices, a coil component may be used as a power inductor, a high frequency (HF) inductor, a general bead, a high frequency (GHz) bead, a common mode filter, and the like.

First Embodiment and Modified Examples

Figure 2:
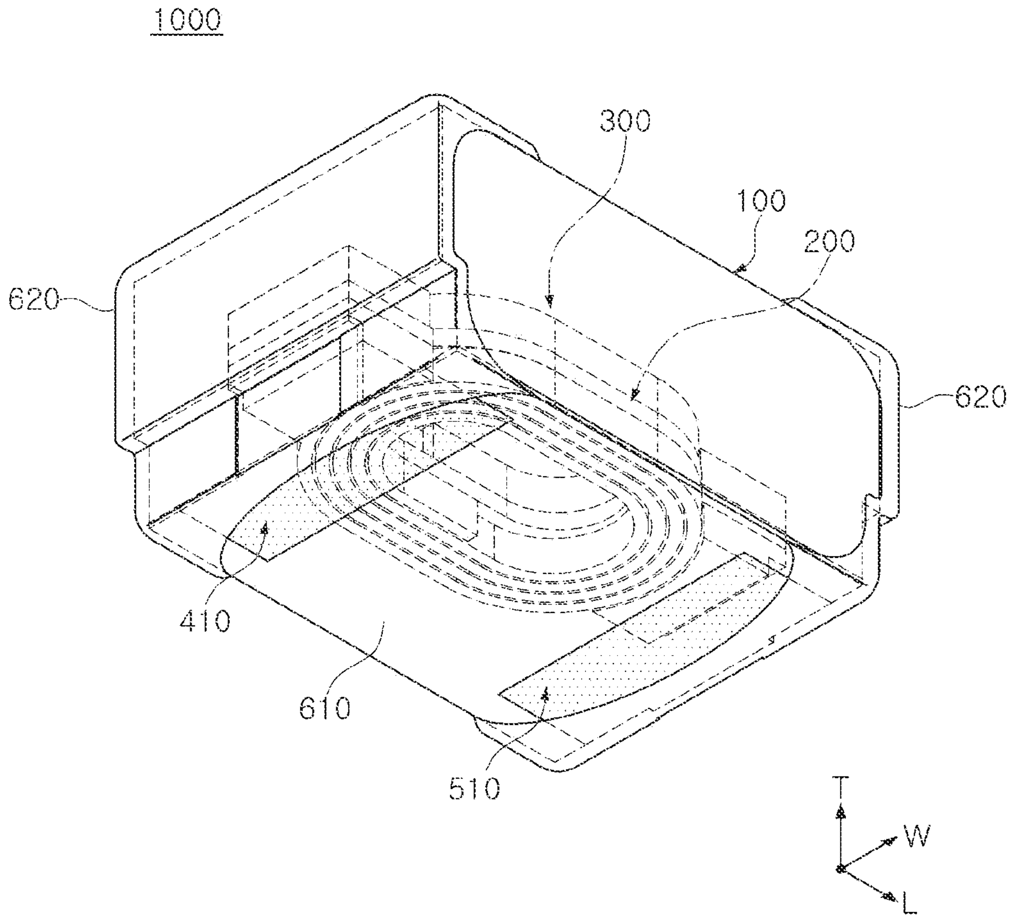
FIG. 2 is a schematic perspective view of the coil component according to the first embodiment of the present disclosure when viewed from below.
Figure 3:
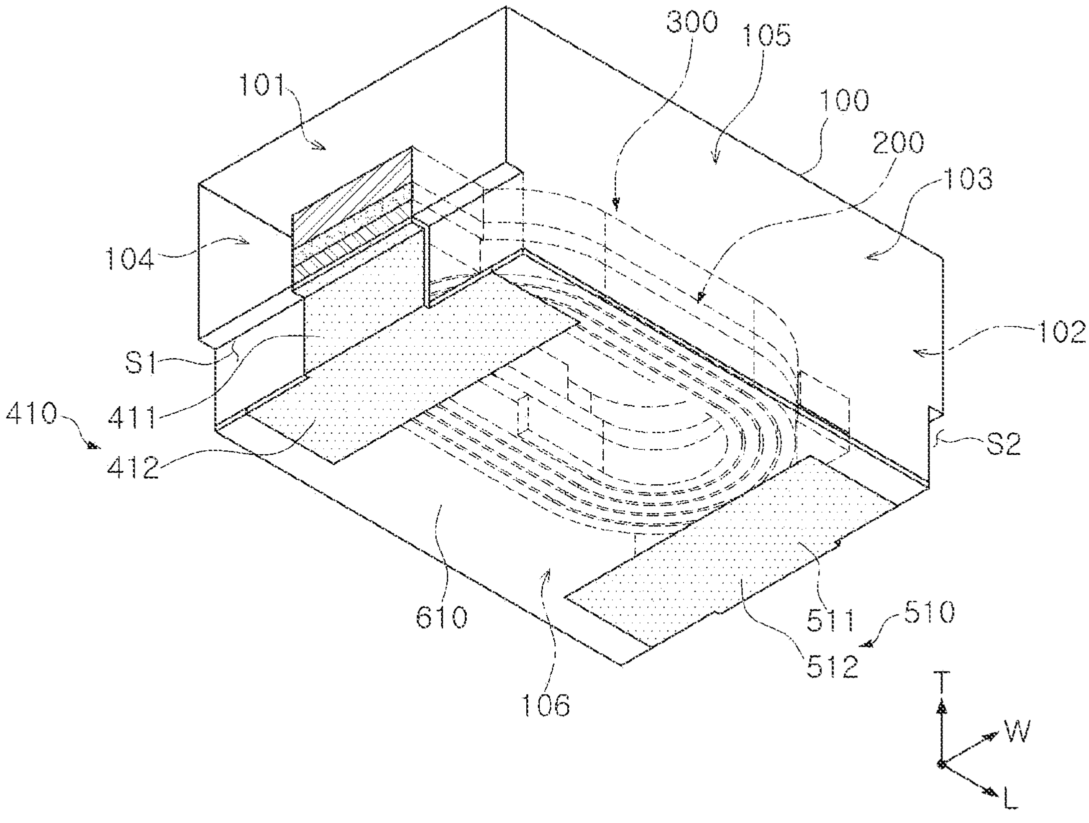
FIG. 3 is schematic perspective view in a state in which a surface insulating layer is omitted from FIG. 2.
Figure 4:
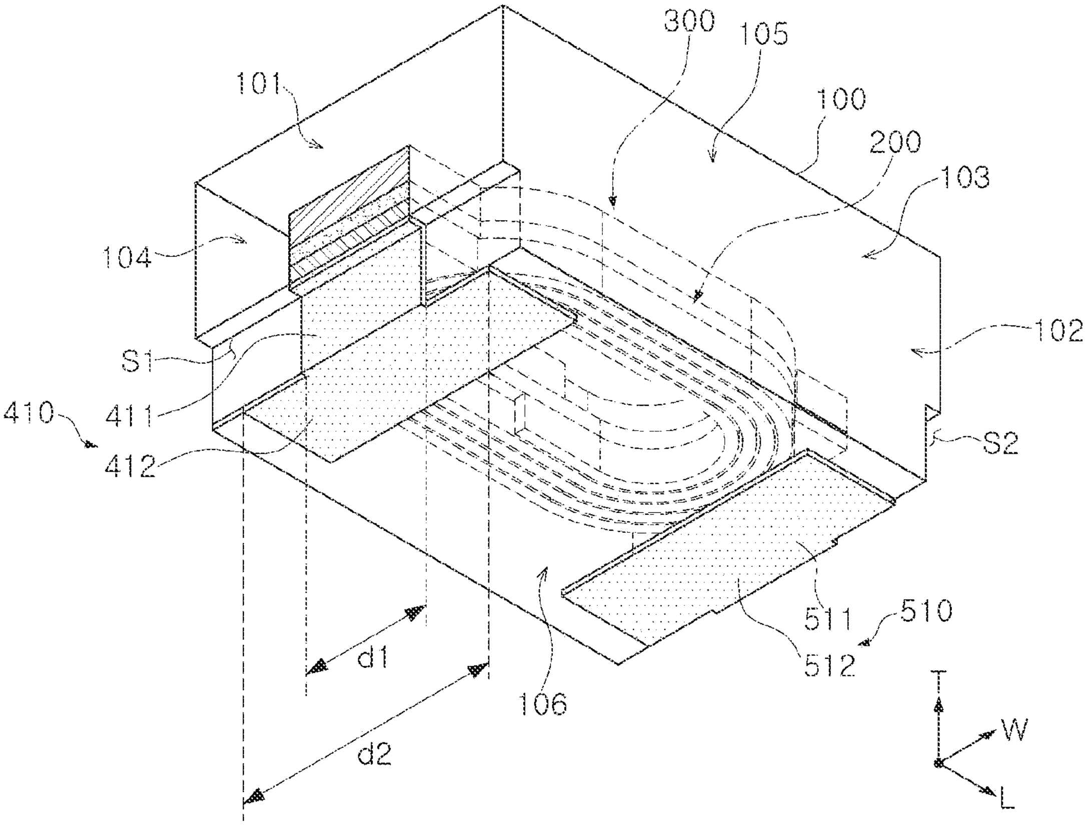
FIG. 4 is a schematic perspective view in a state in which a lower insulating layer is omitted from FIG. 3.
Figure 5:
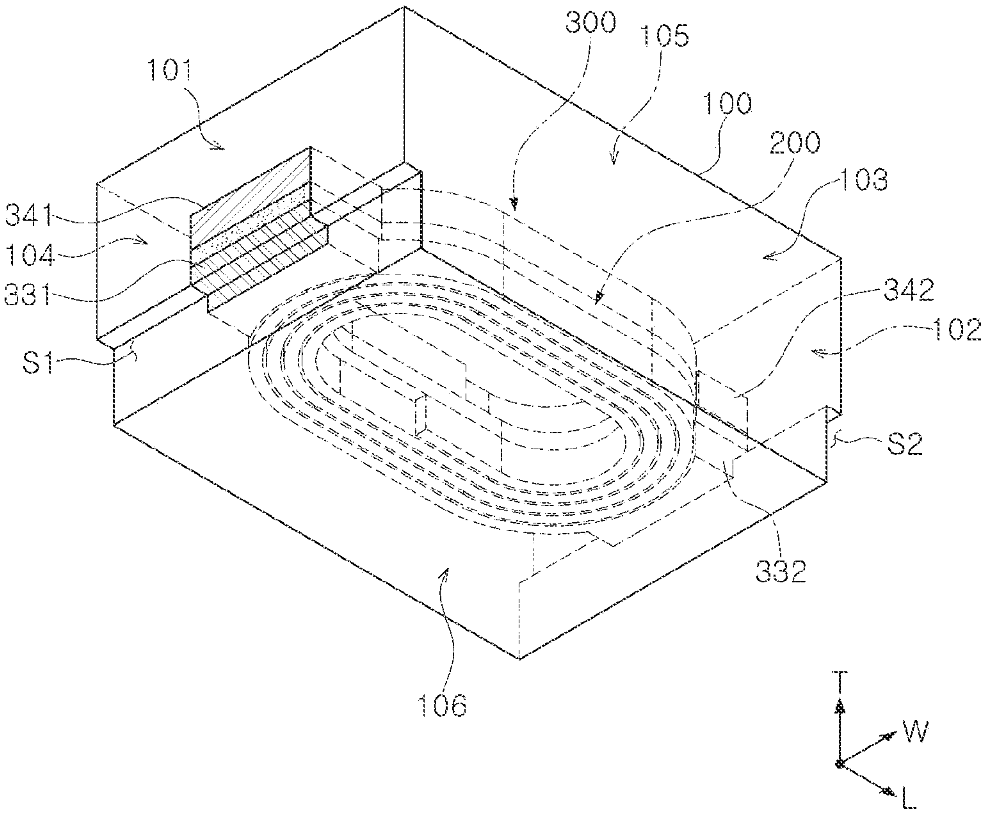
FIG. 5 is a schematic perspective view in a state in which external electrodes are omitted from FIG. 4.
Figure 6:
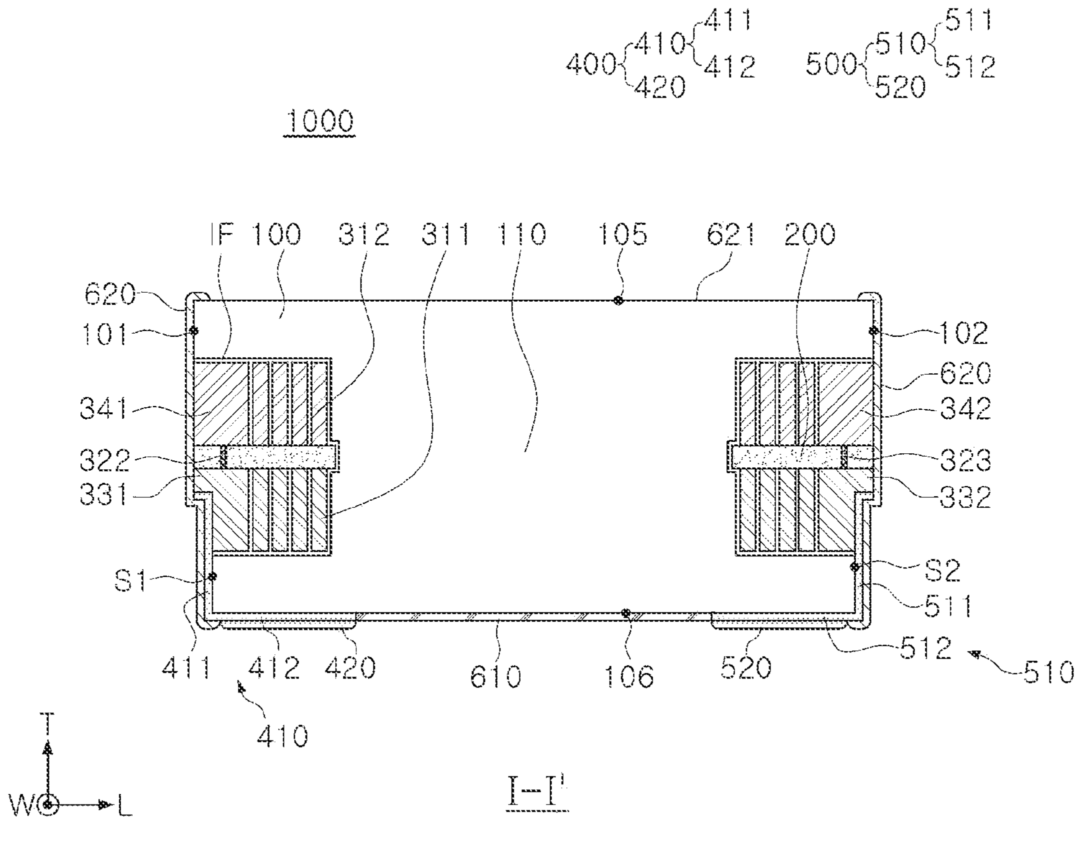
FIG. 6 is a cross-sectional view taken along line I-I' of FIG. 1.
Figure 7:
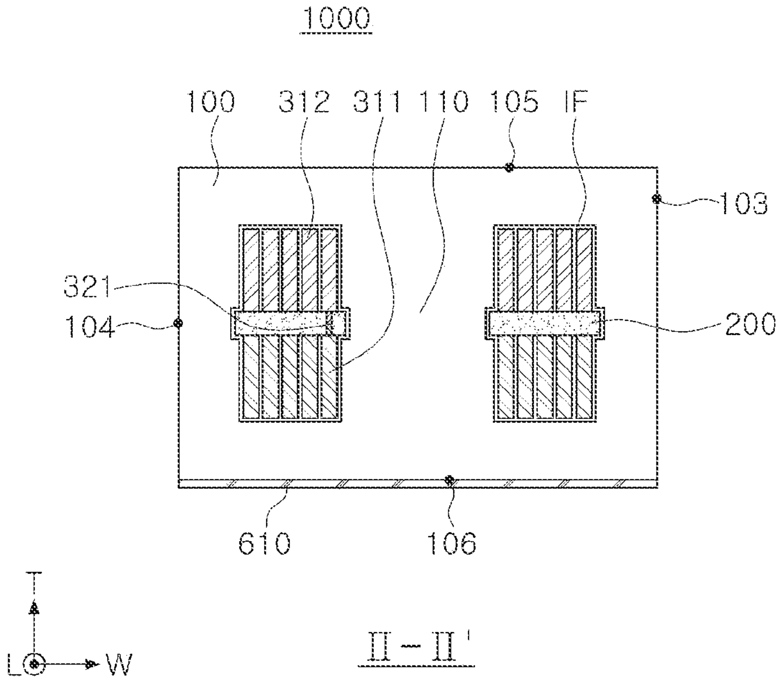
FIG. 7 is a cross-sectional view taken along line II-II' of FIG. 1.
Figure 8:
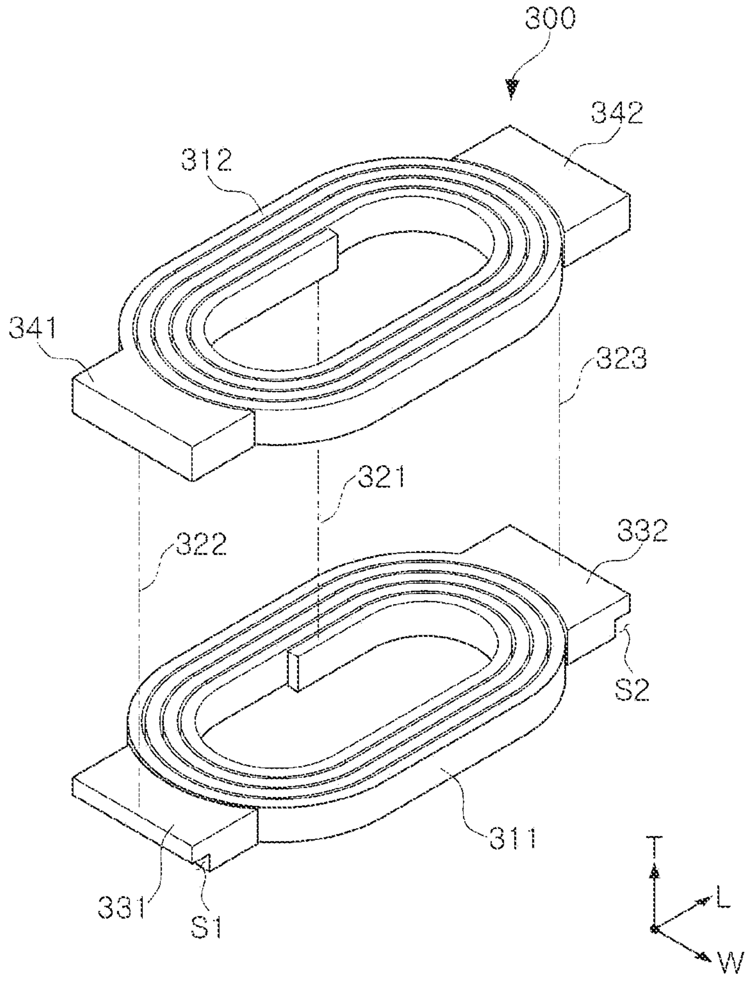
FIG. 8 is an exploded view of a coil portion.

FIG. 1 is a schematic perspective view of a coil component according to a first embodiment. FIG. 2 is a schematic perspective view of the coil component according to the first embodiment when viewed from below. FIG. 3 is schematic perspective view in a state in which a surface insulating layer is omitted from FIG. 2, FIG. 4 is a schematic perspective view in a state in which a lower insulating layer is omitted from FIG. 3, and FIG. 5 is a schematic perspective view in a state in which external electrodes are omitted from FIG. 4. FIG. 6 is a cross-sectional view taken along line I-I' of FIG. 1, and FIG. 7 is a cross-sectional view taken along line II-II' of FIG. 1. FIG. 8 is an exploded view of a coil portion. For an understanding of the present disclosure, a second metal layer of each of first and second external electrodes is omitted in FIGS. 2 to 4.

Referring to FIGS. 1 to 8, a coil component 1000 according to the first embodiment may include a body 100, a support substrate 200, a coil portion 300, external electrodes 400 and 50, and insulating layers 610 and 620, and an insulating layer IF.

The body 100 may form an exterior of the coil component 1000, and may embed the coil portion 300 and the support substrate 200 therein.

The body 100 may be formed to have a hexahedral shape overall.

Based on FIGS. 1 to 8, the body 100 has a first surface 101 and a second surface 102 opposing each other in a length direction L, a third surface 103 and a fourth surface 104 opposing each other in a width direction W, and a fifth surface 105 and a sixth surface 106 opposing each other in a thickness direction T. Each of the first to fourth surfaces 101, 102, 103, and 104 of the body 100 may correspond to a wall surface of the body 100 connecting the fifth surface 101 and the sixth surface 106 of the body 100. Hereinafter, two end surfaces (a first end surface and a second end surface) of the body 100 may refer to the first surface 101 and the second surface 102 of the body 100, respectively, and two side surfaces (a first side surface and a second side surface) of the body 100 may refer to the third surface 103 and the fourth surface 104, respectively. In addition, two opposing surfaces of the body 100 in the thickness direction T may refer to the sixth surface 106 and the fifth surface 105 of the body 100, respectively.

As an example, the body 100 may be formed in such a manner that the coil component 1000, including the external electrodes 400 and 500 and the insulating layers 610 and 620 to be described later, has a length of 2.0 mm, a width of 1.2 mm, and a thickness of 0.65 mm, but the present disclosure is not limited thereto. Since the above values are only design values, which do not reflect process errors, or the like, they should be regarded as belonging to the scope of the present disclosure to the extent that they can be recognized as process errors.

As an example, the length of the coil component 1000 may refer to a maximum value, among lengths of a plurality of segments, connecting two outermost boundary lines opposing each other in a length (L) direction of the coil component 1000 and parallel to the length (L) direction of the coil component 1000, based on an optical microscope or scanning electron microscope (SEM) image for a cross section of the coil component 1000 in a length-thickness (L-T) direction in a central portion of the coil component 1000 in a width (W) direction. Alternatively, the length of the coil component 1000 may refer to a minimum value, among lengths of a plurality of segments connecting two outermost boundary lines opposing each other in the length (L) direction of the coil component 1000 illustrated in the cross-sectional image and parallel to the length (L) direction of the coil component 1000. Alternatively, the length of the coil component 1000 may refer to an arithmetic mean of at least two segments, among a plurality of segments connecting two outermost boundary lines opposing each other in the length (L) direction of the coil component 1000, illustrated in the cross-sectional image, and parallel to the length (L) direction of the coil component 1000.

The thickness of the coil component 1000 may refer to a maximum value, among lengths of a plurality of segments, connecting two outermost boundary lines opposing each other in a thickness (T) direction of the coil component 1000 and parallel to the thickness (T) direction of the coil component 1000, based on an optical microscope or scanning electron microscope (SEM) image for a cross section of the coil component 1000 in a length-thickness (L-T) direction in a central portion of the body 100 in a width (W) direction. Alternatively, the thickness of the coil component 1000 may refer to a minimum value, among lengths of a plurality of segments connecting two outermost boundary lines opposing each other in a thickness (T) direction of the coil component 1000 illustrated in the cross-sectional image and parallel to the thickness (T) direction of the coil component 1000. Alternatively, the thickness of the coil component 1000 may refer to an arithmetic mean of at least two segments, among a plurality of segments connecting two outermost boundary lines opposing each other in a thickness (T) direction of the coil component 1000, illustrated in the cross-sectional image, and parallel to the thickness (T) direction of the coil component 1000.

The width of the coil component 1000 may refer to a maximum value, among lengths of a plurality of segments, connecting two outermost boundary lines opposing each other in a width (W) direction of the coil component 1000 and parallel to the width (W) direction of the coil component 1000, based on an optical microscope or scanning electron microscope (SEM) image for a cross section of the coil component 1000 in a length-thickness (L-T) direction in a central portion of the body 100 in a width (W) direction. Alternatively, the width of the coil component 1000 may refer to a minimum value, among lengths of a plurality of segments connecting two outermost boundary lines opposing each other in a width (W) direction of the coil component 1000 illustrated in the cross-sectional image and parallel to the width (W) direction of the coil component 1000. Alternatively, the length of the coil component 1000 may refer to an arithmetic mean of at least two segments, among a plurality of segments connecting two outermost boundary lines opposing each other in a width (W) direction of the coil component 1000, illustrated in the cross-sectional image, and parallel to the width (W) direction of the coil component 1000.

Alternatively, each of the length, the width, and the thickness of the coil component 1000 may be measured by a micrometer measurement method. In the micrometer measurement method, measurement may be performed may be measured by setting a zero point using a micrometer (instrument) with gage repeatability and reproducibility (R&R), inserting the coil component 1000 inserted between tips of the micrometer, and turning a measurement lever of the micrometer. When the length of the coil component 1000 is measured by a micrometer measurement method, the length of the coil component 1000 may refer to a value measured once or an arithmetic mean of values measured multiple times. This may be equivalently applied to the width and the thickness of the coil component 1000.

The body 100 may include a magnetic material and a resin. Specifically, the body 100 may be formed by laminating at least one magnetic composite sheet in which a magnetic material is dispersed in a resin. However, the body 100 may have a structure, other than the structure in which a magnetic material is dispersed in a resin. For example, the body 100 may be formed of a magnetic material such as ferrite, or a non-magnetic material.

The magnetic material may be ferrite or magnetic metal powder particles.

Examples of the ferrite powder particles may include at least one or more of spinel type ferrites such as Mg—Zn-based ferrite, Mn—Zn-based ferrite, Mn—Mg-based ferrite, Cu—Zn-based ferrite, Mg—Mn—Sr-based ferrite, Ni—Zn-based ferrite, and the like, hexagonal ferrites such as Ba—Zn-based ferrite, Ba—Mg-based ferrite, Ba—Ni-based ferrite, Ba—Co-based ferrite, Ba—Ni—Co-based ferrite, and the like, garnet type ferrites such as Y-based ferrite, and the like, and Li-based ferrites.

The magnetic metal powder particle may include one or more selected from the group consisting of iron (Fe), silicon (Si), chromium (Cr), cobalt (Co), molybdenum (Mo), aluminum (Al), niobium (Nb), copper (Cu), and nickel (Ni). For example, the magnetic metal powder particle may be at least one or more of a pure iron powder, a Fe—Si-based alloy powder, a Fe—Si—Al-based alloy powder, a Fe—Ni-based alloy powder, a Fe—Ni—Mo-based alloy powder, a Fe—Ni—Mo—Cu-based alloy powder, a Fe—Co-based alloy powder, a Fe—Ni—Co-based alloy powder, a Fe—Cr-based alloy powder, a Fe—Cr—Si-based alloy powder, a Fe—Si—Cu-Mb-based alloy powder, a Fe—Ni—Cr-based alloy powder, and a Fe—Cr—Al-based alloy powder.

The magnetic metal powder particle may be amorphous or crystalline. For example, the magnetic metal powder particle may be a Fe—Si—B—Cr-based amorphous alloy powder, but is not limited thereto.

Each of the magnetic metal powder particles 10 may have an average diameter of about 0.1 μm to 30 μm, but is not limited thereto. The term "average diameter" of the magnetic metal powder particles 10 may refer to a particle-size distribution expressed as D50 or D90.

The body 100 may include two or more types of magnetic metal powder particle dispersed in a resin. The term "different types of magnetic powder particle" means that the magnetic powder particles, dispersed in the resin, are distinguished from each other by at least one of average diameter, composition, crystallinity, and shape.

The resin may include epoxy, polyimide, liquid crystal polymer, or the like, in a single form or combined forms, but is not limited thereto.

The body 100 may include a core 110 penetrating through the coil portion 300 to be described later. The core 110 may be formed by filling a through-hole of the coil portion 300 with a magnetic composite sheet, but the present disclosure is not limited thereto.

A first slit portion S1 and a second slit portion S2 may be formed on a corner portion between each of the first and second surfaces 101 and 102 of the body 100 and the sixth surface 106 of the body 100. Specifically, the first slit portion S1 may be defined at a corner portion of the body between the first surface 101 of the body 100 and the sixth surface 106 of the body 100, and the second slit portion S2 may be defined at a corner portion of the body between the second surface 102 of the body 100 and the sixth surface 106 of the body 100. The first and second slit portions S1 and S2 may be formed to have a depth at which lead-out patterns 331 and 332 to be described later are exposed to internal surfaces of the first and second slit portions S2 and S2 (the depth referring to a dimension of the first and second slit portions S1 and S2 in the thickness direction T). However, the first and second slit portions S1 and S2 do not extend to the fifth surface S5 of the body 100. For example, the first and second slit portions S1 and S2 do not penetrate through the body 100 in the thickness direction T.

The first and second slit portions S1 and S2 may extend to the third and fourth surfaces 103 and 104 of the body 100 in the width direction W of the body 100, respectively. For example, each of the first and second slit portions S1 and S2 may have a shape of a slit formed in the entire width direction W of the body 100. The first and second slit portions S1 and S2 may be performed by pre-dicing on one surface of a coil bar along a boundary line matching a width direction of each coil component, among boundary lines individualizing coil components, at a coil bar level, a state in which each of the coil components is individualized. A depth in such pre-dicing may be adjusted to expose the lead-out patterns 331 and 332.

Internal surfaces (internal walls and bottom surfaces) of the slit portion S1 and S2 may also constitute the surfaces of the body 100. However, for ease of description in the present specification, the internal surfaces of the slit portion S1 and S2 will be distinguished from the surfaces of the body 100. In FIGS. 1 to 8, the first and second slit portions S1 and S2 are illustrated as having internal walls, parallel to the first and second surfaces 101 and 102 of the body 100, and bottom surfaces parallel to the fifth and sixth surfaces 105 and 106 of the body 100. However, this is for ease of description, and the scope of the present embodiment is not limited thereto. As an example, the first slit portion S1 may be formed to have a curved shape, in which the internal surface connects the first surface 101 and the sixth surface 106 of the body 100 to each other, based on a cross section of the coil component 1000 according to the present embodiment in the length direction L-the thickness direction T (an L-T cross section). However, for ease of description, each of the slit portions S1 and S2 will be described as having an internal wall and a bottom surface.

The support substrate 200 may be disposed inside the body 100. The support substrate 200 may be configured to support the coil portion 300 to be described later.

The support substrate 200 may include an insulating material, for example, a thermosetting insulating resin such as an epoxy resin, a thermoplastic insulating resin such as polyimide, or a photosensitive insulating resin, or the support substrate 200 may include an insulating material in which a reinforcing material such as a glass fiber or an inorganic filler is impregnated with an insulating resin. For example, the support substrate 200 may include an insulating material such as prepreg, Ajinomoto Build-up Film (ABF), FR-4, a bismaleimide triazine (BT) film, a photo-imageable dielectric (PID) film, and the like, or a metal-stacked plate such as a copper clad laminate (CCL), but the present is not limited thereto.

The inorganic filler may be at least one or more selected from the group consisting of silica ($SiO_2$), alumina ($Al_2O_3$), silicon carbide (SiC), barium sulfate ($BaSO_4$), talc, mud, a mica powder, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$).

When the support substrate 200 is formed of an insulating material including a reinforcing material, the support substrate 200 may provide more improved rigidity. When the support substrate 200 is formed of an insulating material including no glass fiber, it is advantageous in thinning the coil component 1000. In addition, based on the body 100 having the same size, a volume occupied by the coil portion 300 and/or a magnetic material may be increased to improve characteristics of the coil component 1000. When the support substrate 200 is formed of an insulating material including a photosensitive insulating resin, the number of processes for forming the coil portion 300 may be decreased. Therefore, it may be advantageous in reducing production costs, and a fine via may be formed.

The coil portion 300 may be disposed on the support substrate 200 inside the body 100 to express characteristics of the coil component 1000. For example, when the coil component 1000 according to the present embodiment is used as a power inductor, the coil portion 300 may store an electric field as a magnetic field to maintain an output voltage, serving to stabilize power of an electronic device.

The coil portion 300 may include coil patterns 311 and 312, vias 321, 322 and 323, lead-out patterns 331 and 332, and sub-lead-out patterns 341 and 342. Specifically, based on the directions of FIGS. 1, 6, 7, and 8, a first coil pattern 311 and first and second lead-out patterns 313 and 332 may be disposed on a lower surface of the support substrate 200 facing the sixth surface 106 of the body 100, and a second coil pattern 312 and second and third sub-lead-out patterns 341 and 342 may be disposed on an upper surface of the support substrate 200 opposing the lower surface of the support substrate 200. The first coil pattern 311 may be spaced apart from the first lead-out pattern 331 and may be in contact with the second lead-out pattern 332 on the lower surface of the support substrate 200. The second coil pattern 312 may be in contact with the first sub-lead-out pattern 341 and may be spaced apart from the second sub-lead-out pattern 342 on the upper surface of the support substrate 200. The first via 321 may penetrate through the support substrate 200 to be in contact with and connected to an internal end portion of each of the first coil pattern 311 and the second coil pattern 312. The second via 322 may penetrate through the support substrate 200 to be in contact with and connected to each of the first lead-out pattern 331 and the first sub-lead-out pattern 341. The third via 323 may penetrate through the support substrate 200 to be in contact with and connected to each of the second lead-out pattern 332 and the second sub-lead-out pattern 342. Thus, the coil portion 300 may overall function as a single coil.

Each of the first coil pattern 311 and the second coil pattern 312 may have a planar spiral shape in which at least one turn is formed around the core 110. For example, the first coil pattern 311 may form at least one turn around the core 110 on the lower surface of the support substrate 200.

The first lead-out pattern 331 and the second lead-out pattern 332 may be exposed to internal surfaces of the first and second slit portions S1 and S2. Specifically, the first lead-out pattern 331 may be exposed to the internal surface of the first slit portion S1, and the second lead-out pattern 332 may be exposed to the internal surface of the second slit portion S2. Since the connection portions 411 and 511 of the external electrodes 400 and 500 to be described later are disposed in the first and second slit portions S1 and S2, the coil portion 300 and the external electrodes 400 and 500 may be in contact with each other. Hereinafter, for ease of description, a description will be provided as to a case in which the first and second slit portions S1 and S2 extend inwardly of at least a portion of each of the lead-out patterns 331 and 332 such that the lead-out patterns 331 and 332 are respectively exposed to the internal walls and the bottom surfaces of the first and second slit portions S1 and S2, as illustrated in FIGS. 5 and 6. However, this is only an example and the scope of the present embodiment is limited thereto. For example, a depth of each of the first and second slit portions S1 and S2 may be adjusted to expose the lead-out patterns 331 and 332 to only the bottom surfaces of the first and second slit portions S1 and S2. When the lead-out patterns 331 and 332 are exposed to both the bottom surfaces and the internal walls of the first and second slit portions S1 and S2, contact areas between the lead-out patterns 331 and 332 and the connection portions 411 and 511 of the external electrodes 400 and 500 may be increased to improve bonding strength between the coil portion 300 and the external electrodes 400 and 500.

A first surface of each of the lead-out patterns 331 and 332, exposed to the internal surfaces of the first and second slit portions S1 and S2, may have higher surface roughness than a second surface of each of the lead-out patterns 331 and 332. As an example, when the first and second slit portions S1 and S2 are formed after the lead-out patterns 331 and 332 are formed by electroplating, a portion of each of the lead-out patterns 331 and 332 may be removed in a slit portion forming process. Accordingly, the first surfaces of the lead-out patterns 331 and 332, respectively exposed to the internal surfaces of the first and second slit portions S1 and S2, may be formed to have higher surface roughness than the second surfaces of the lead-out patterns 331 and 332 due to polishing of a dicing tip. As will be described later, the external electrodes 400 and 500 are formed as thin films, so that bonding strength to the coil portion 300 may be relatively low. Since the external electrodes 400 and 500 are in contact with and connected to the first surfaces of the lead-out patterns 331 and 332, respectively, having relatively higher surface roughness, the bonding strength between the external electrodes 400 and 500 and the lead-out patterns 331 and 332 may be improved.

The lead-out patterns 331 and 332 and the sub-lead-out patterns 341 and 342 may be exposed to the first and second surfaces 101 and 102 of the body 100, respectively. For example, the first lead-out pattern 331 may be exposed to the first surface 101 of the body 100, and the second lead-out pattern 332 may be exposed to the second surface 102 of the body 100. The first sub-lead-out pattern 341 may be exposed to the first surface 101 of the body 100, and the second sub-lead-out pattern 342 may be exposed to the second surface 102 of the body 100. Accordingly, as illustrated in FIGS. 5 and 6, the first lead-out pattern 331 may be continuously exposed to the internal wall of the first slit portion S1, the bottom surface of the first slit portion S1, and the first surface 101 of the body 100, and the second lead-out pattern 332 may be continuously exposed to the internal wall of the second slit part S2, the bottom surface of the second slit part S2, and the second surface 102 of the body 100.

At least one of the coil patterns 311 and 312, vias 321, 322, and 323, lead-out patterns 331 and 332, and sub-lead-out patterns 341 and 342 may include at least one conductive layer.

As an example, when the second coil pattern 312, the sub-lead-out patterns 341 and 342, and the vias 321, 322, and 323 are formed on the upper surface side of the support substrate 200 by plating, each of the second coil pattern 312, the sub-lead-out patterns 341 and 342, and the vias 321, 322, and 323 may include a seed layer and an electroplating layer. In this case, the electroplating layer may have a single layer structure or a multilayer structure. An electroplating layer having a multilayer structure may be formed to have a conformal layer structure in which one electroplating layer is formed along a surface of another electroplating layer, or may be formed to have a structure in which one electroplating layer is staked on only one surface of another electroplating layer. The seed layer may be formed by electroless plating or vapor deposition such as sputtering. The seed layer of the second coil pattern 312, the seed layer of the sub-lead-out patterns 341 and 342, and the seed layer of the vias 321, 322, and 323 may be integrated with each other, such that boundaries therebetween may not be formed, but the present disclosure is not limited thereto. The electroplating layer of the second coil pattern 312, the electroplating layers of the sub-lead-out patterns 341 and 342, and the electroplating layers of the vias 321, 322, and 323 may be integrated with each other, such that boundaries therebetween may not be formed, but the present disclosure is not limited thereto.

As another example, when the first coil pattern 311 and the lead-out patterns 331 and 332, disposed on a side of the lower surface of the support substrate 200, and the second coil pattern 312, disposed on a side of the upper surface of the support substrate 200, are separately formed and then collectively laminated on the support substrate 200, the vias 321, 322, and 323 may include a high-melting-point metal layer and a low-melting-point metal layer having a lower melting point than the high-melting-point metal layer. The low-melting-point metal layer may be formed of a solder including lead (Pb) and/or tin (Sn). At least a portion of the low-melting-point metal layer may be melted due to pressure and temperature at the time of the collective lamination to form, for example, an intermetallic compound (IMC) layer on a boundary between the low-melting-point metal layer and the second coil pattern 312.

As an example, the coil patterns 311 and 312, the lead-out patterns 331 and 332, and the sub-lead-out patterns 341 and 342 may be formed to protrude to each of the lower and upper surfaces of the support substrate 200, as illustrated in FIGS. 6 and 7. As another example, the first coil pattern 311 and the lead-out patterns 331 and 332 may be formed to protrude to the lower surface of the support substrate 200, and the second coil pattern 312 and the sub-lead-out patterns 341 and 342 may be embedded in the upper surface of the substrate 200 to expose upper surfaces thereof to the upper surface of the support substrate 200. In this case, a concave portion may be formed on the upper surface of the second coil pattern 312 and/or the upper surfaces of the sub-lead-out patterns 341 and 342, and thus, the upper surface of the support substrate 200, the upper surface of the second coil pattern 312, and/or the upper surfaces of the sub-lead-out patterns 341 and 342 may not be coplanar with each other.

Each of the coil patterns 311 and 312, the vias 321, 322, and 323, the lead-out patterns 331 and 332, and the sub-lead-out patterns 341 and 42 may be formed of a conductive material such as copper (Cu), aluminum (Al), silver (Ag), tin (Sn), gold (Au), nickel (Ni), lead (Pb), titanium (Ti), chromium (Cr), or alloys thereof, but the present disclosure limited thereto.

The external electrodes 400 and 500 may be disposed to be spaced apart from each other on the sixth surface 106 of the body 100, and may extend onto the first and second slit portions S1 and S2 to be in contact with the first and second lead-out patterns 331 and 332, respectively. In the present embodiment, the first external electrode 400 may include a first metal layer 410 and a second metal layer 420, and the second external electrode 500 may include a first metal layer 510 and a second metal layer 520. The first metal layers 410 and 510 may include connection portions 411 and 511, disposed on the slit portions S1 and S2 to be in contact with the lead-out patterns 331 and 332 exposed to internal surfaces of the slit portions S1 and S2, and pad portions 412 and 512 disposed on the sixth side 106 of the body 100. The second metal layers 420 and 520 may be disposed on the pad portions 412 and 512 of the first metal layers 410 and 510. Specifically, the first metal layer 410 of the first external electrode 400 may include a first connection portion 410, disposed on the bottom surface and the internal wall of the first slit portion S1 to be in contact with the first lead-out pattern 331 of the coil portion 300, and a first pad portion 422 disposed on the sixth surface 106 of the body 100, and the second metal layer 420 of the first external electrode 400 may be disposed on the first pad portion 412 of the first metal layer 410. The first metal layer 510 of the second external electrode 500 may include a second connection portion 511, disposed on a bottom surface and an internal wall of the second slit portion S2 to be in contact with and connected to the second lead-out pattern 332 of the coil portion 300, and a second pad portion 512 disposed on the sixth surface 106 of the body 100, and the second metal layer 520 of the second external electrode 500 may be disposed on the second pad portion 512 of the first metal layer 510. The pad portions 412 and 512 of the external electrodes 400 and 500 may be disposed to be spaced apart from each other on the sixth surface 106 of the body 100, and the second metal layers 420 and 520 of the external electrodes 400 and 500 may be disposed to be spaced apart from each other on the sixth surface 106 of the body 100.

The first metal layers 410 and 510 may be formed along the bottom surfaces and the internal walls of the slit portions S1 and S2 and the sixth surface 106 of the body 100. For example, the first metal layers 410 and 510 may be formed to have a conformal layer shape on the internal surfaces of the slit portions S1 and S2 and the sixth surface 106 of the body 100. The connection portions 411 and 511 and the pad portions 412 and 512 of the first metal layers 410 and 510 may be formed together in the same process to be integrated with each other on the internal surfaces of the slit portions S1 and S2 and the sixth surface 106 of the body 100. For example, no boundary may be formed between the connection portions 411 and 511 and the pad portions 412 and 512.

The connection portions 411 and 511 may be disposed in central portions of the first and second slit portions S1 and S2 to be spaced apart from the third and fourth surfaces 103 and 104 of the body 100, respectively. For example, the connection portions 411 and 511 may be disposed in central portions of the internal surfaces of the first and second slit portions S1 and S2 in the width direction W. Since the lead-out patterns 331 and 332 are exposed to the central portions of the internal surfaces of the first and second slit portions S1 and S2 in the width direction W, the connection portions 411 and 511 may only be formed in regions, in which the lead-out patterns 331 and 332 are exposed, of the internal surfaces of the first and second slit portions S1 and S2.

The pad portions 412 and 512 may be disposed on the sixth surface 106 of the body 100 to be spaced apart from the third and fourth surfaces 103 and 104 of the body 100, respectively. In this case, the coil component 1000 according to the present embodiment may be prevented from being short-circuited with other another component mounted on an external side of a mounting board, or the like, in the width direction W.

At least one of distances from each of the third and fourth surfaces 103 and 104 of the body 100 to the pad portions 412 and 512 may be less than at least one of distances from each to the connection portions 411 and 511 to the connection portions 411 and 511. As an example, a length d1 of each of the connection portions 411 and 511 in the width direction W may be less than a length d2 of each of the pad portions 412 and 512 in the width direction W. The sixth surface 106 of the body 100 is used as a mounting surface when the coil component 1000 according to the present embodiment is mounted on a mounting board, and the second metal layers 420 and 520 disposed on the pad portions 412 and 512 of the external electrodes 400 and 500 may be connected to a connection pad of the mounting board through a bonding member such as a solder. In this case, since the length d2 of each of the pad portions 412 and 512 in the width direction W is greater than the length d1 of each of the connection portions 411 and 511 in the width direction W, a length of each of the second metal layers 420 and 520, in contact with the bonding member such as a solder, in the width direction W may be increased. In addition, since the length d1 of each of the connection portions 411 and 511 in the width direction W is less than the length d2 of each of the pad portions 412 and 512 in the width direction W, short-circuit with another adjacent component mounted on the mounting board in the length direction L may be prevented. For example, a size of each of the connection portions 411 and 511, disposed to be closest to other components in the length direction L during mounting (the length d1 thereof in the length direction L), among the configurations of the external electrodes 400 and 500, may be decreased to reduce possibility of occurrence of short-circuit with other components.

The second metal layers 420 and 520 may be disposed on the pad portions 412 and 512. Specifically, the second metal layer 420 of the first external electrode 400 may be disposed on the first pad portion 412, and the second metal layer 520 of the second external electrode 500 may be disposed on the second pad portion 512. The second metal layers 420 and 520 may be formed to have a single-layer structure or a multilayer structure. As an example, the second metal layers 420 and 520 may be sequentially formed on the pad portions 412 and 512, including copper (Cu), by plating. Each of the second metal layers 420 and 520 may include a nickel (Ni) plating layer, including Ni, and a tin (Sn) plating layer, including Sn, but the present disclosure is not limited thereto.

The external electrodes 400 and 500 may be formed by vapor deposition such as sputtering and/or plating, but the present disclosure is not limited thereto.

Each of the external electrodes 400 and 500 may be formed of a conductive material such as copper (Cu), aluminum (Al), silver (Ag), tin (Sn), gold (Au), nickel (Ni), lead (Pb), chromium (Cr), titanium (Ti), or alloys thereof, but the present disclosure is not limited thereto.

The insulating layer IF may be disposed between the coil portion 300 and the body 100 and between the support substrate 200 and the body 100. The insulating layer IF may be formed along surfaces of the lead-out patterns 331 and 332, the coil patterns 311 and 312, the support substrate 200, and the sub-lead-out patterns 341 and 342, but the present disclosure is not limited thereto. The insulating layer IF may be provided to insulate the coil portion 300 and the body 100 from each other, and may include a known insulating material such as parylene, but the present disclosure is not limited thereto. As another example, the insulating layer IF may include an insulating material such as an epoxy resin, rather than parylene. The insulating layer IF may be formed by vapor deposition, but the present disclosure is not limited thereto. As another example, the insulating layer IF may be formed by laminating an insulation film for forming the insulating layer IF on both surfaces of the support substrate 210, on which the coil portion 300 is formed, and curing the laminated insulating film. Alternatively, the insulating layer IF may be formed by applying an insulating paste for forming the insulating layer IF on both surfaces of the support substrate 210, on which the coil portion 300 is formed, and curing the applied insulating paste. For the above reasons, the insulating layer IF may be omitted in the present embodiment. For example, when the body 100 has sufficient electrical resistance at designed operating current and voltage of the coil component 1000 according to the present embodiment, the insulating layer IF may be omitted in the present embodiment.

A lower insulating layer 610 may be disposed on the sixth surface 106 of the body 100 to expose the pad portions 412 and 512. The lower insulating layer 610 may be disposed on external sides of both ends of each of the pad portions 412 and 512 in the width direction (W), allowing the pad portions 412 and 512 to be respectively spaced apart from the third and fourth surfaces 103 and 103 of the body 100. The lower insulating layer 610 may prevent the coil component 1000 according to the present embodiment from being short-circuited with other adjacent components mounted in the width direction W. In addition, the lower insulating layer 610 may prevent an effective mounting area (an area occupied by the coil component 1000 according to the present embodiment in a mounting board) from being increased by a size occupied by a bonding member such as a solder.

As an example, the lower insulating layer 610 may be formed on the sixth surface 106 of the body 100 before formation of the external electrodes 400 and 500. Accordingly, the lower insulating layer 610 may serve as a mask when the first metal layers 410 and 510 of the external electrodes 400 and 500 are selectively formed on the sixth surface 106 of the body 100 and the internal surfaces of the first and second slit portions S1 and S2. As an example, the lower insulating layer 610 may serve as a plating resist when the first metal layers 410 and 510 of the external electrodes 400 and 500 are formed by plating.

The lower insulating layer 610 may be collectively formed in each coil component in a coil bar state in which each coil component is individualized. For example, a process of forming the lower insulating layer 610 may be performed between the above-described pre-dicing process and the individualization process (the full-dicing process).

The lower insulating layer 610 may include may include a thermoplastic resin such as a polystyrene-based resin, a vinyl-acetate-based resin, a polyester-based resin, a polyethylene-based resin, a polypropylene-based resin, a polyamide-based resin, a rubber-based resin, or an acrylic-based resin, a thermosetting resin such as a phenol-based resin, an epoxy-based resin, a urethane-based resin, a melamine-based resin, or an alkyd-based resin, a photosensitive resin, parylene, $SiO_x$, or $SiN_x$. The lower insulating layer 610 may further include an insulating filler such as an inorganic filler, but the present disclosure is not limited thereto. The lower insulating layer 610 may be formed by laminating an insulating layer on the sixth surface 106 of the body 100, applying and curing an insulating paste, or vapor deposition of an insulating material, but the present disclosure is not limited thereto.

A surface insulating layer 620 may be disposed on each of the first and second slit portions S1 and S2 to cover at least a portion of the first and second external electrodes 400 and 500, and may extend onto at least portions of the sixth surface 106 of the body 100. The surface insulating layer 620, disposed on the first slit portion S1, may cover the first connection portion 411 and may extend onto at least a portion of the sixth surface 106 of the body 100 to cover at least a portion of each of the lower insulating layer 610 and the first pad portion 412. The surface insulating layer 620, disposed on the second slit portion S2, may cover the second connection portion 511 and may extend onto at least a portion of the sixth surface 106 of the body 100 to cover at least a portion of each of the lower insulating layer 610 and the second pad portion 512. The surface insulating layer 620 may serve as a plating resist together with the lower insulating layer 610 when the second metal layers 420 and 520 of the external electrodes 400 and 500 are formed by plating. Accordingly, the surface insulating layer 620 may be formed on the body 100 to cover the connection portions 411 and 511 and to expose the pad portions 412 and 512 after formation of the first metal layers 410 and 510, and thus, may define a region, in which the second metal layers 420 and 520 are to be formed, together with the lower insulating layer 610. However, the present disclosure is not limited thereto.

The surface insulating layer 620 may include may include a thermoplastic resin such as a polystyrene-based resin, a vinyl-acetate-based resin, a polyester-based resin, a polyethylene-based resin, a polypropylene-based resin, a polyamide-based resin, a rubber-based resin, or an acrylic-based resin, a thermosetting resin such as a phenol-based resin, an epoxy-based resin, a urethane-based resin, a melamine-based resin, or an alkyd-based resin, a photosensitive resin, parylene, $SiO_x$, or $SiN_x$.

The surface insulating layer 620 may have an adhesive function. For example, when the surface insulating layer 620 is formed by laminating an insulating film on the slit portions S1 and S2, the insulating film may have adhesive ingredient to adhere to the slit portions S1 and S2. In this case, an additional adhesive layer may be formed on one surface of the surface insulating layer 620. However, an additional adhesive layer may not be formed on one surface of the surface insulating layer 620 when the surface insulating layer 620 is formed using an insulating film in a semi-cured state (B-stage).

The surface insulating layer 620 may be formed by applying a liquid insulating resin to the surface of the body 100, laminating an insulating film on the surface of the body 100, or forming an insulating resin on the surface of the body 100 using vapor deposition. Alternatively, the surface insulating layer 620 may be formed by disposing a material for forming a surface insulating layer on a silicon die, or the like, and stamping the body 100 on the silicon die. The insulating film may be a dry film (DF) including a photosensitive insulating resin, an Ajinomoto Build-up Film (ABF) not including a photosensitive insulating resin, a polyimide film, or the like.

A thickness of the surface insulating layers 610 and 620 may be within the range of 10 nm to 100 μm. When the thickness of the surface insulating layer 620 is less than 10 nm, characteristics of coil components, such as a Q factor, a breakdown voltage, a self-resonant frequency (SRF), and the like, may be decreased. In addition, when the thickness of the surface insulating layer 620 is greater than 100 μm, total length, width, and thickness of the coil component may be increased to result in a disadvantage for thinning, and an effective volume of a magnetic material may be reduced, as compared with a component having the same volume, to deteriorate component characteristics.

The surface insulating layer 620 may cover each of the first and second surfaces 101 and 102 of the body 100, may extend onto at least a portion of each of the third to sixth surfaces 103, 104, 105, and 106 of the body 100. As an example, the surface insulating layer 620, disposed on the first slit portion S1 to cover the first connection portion 411, may extend to cover the first surface 101 of the body 100 and may extend onto at least a portion of each of the third to sixth surfaces 103, 104, 105, and 106 of the body 100. In this case, a portion of the surface insulating layer 620, extending onto at least a portion of each of the third to sixth surfaces 103, 104, 105, and 106 of the body 100, may be formed to have a greatest length on a corner portion formed by two of the third to sixth surfaces 103, 104, 105, and 106 of the body 100, and thus, may cover a vertex region formed by three surfaces, among the first surface 101 and the third to sixth surfaces 103, 104, 105, and 106 of the body 100 and the internal surface of the first slit portion S1. In addition, in the surface insulating layer 620 disposed on the first surface 101 of the body 100 and the internal surface of the first slit portion S1, a portion extending onto the fifth surface 105 of the body 100 may be formed to have a greatest length on a corner portion formed by the fifth surface 105 of the body 100 and each of the third and fourth surfaces 103 and 104 of the body 100. In addition, in the surface insulating layer 620 disposed on the first surface 101 of the body 100 and the internal surface of the first slit portion s1, a portion extending onto the sixth surface 106 of the body 100 may be formed to have a greatest length on a corner portion formed by the sixth surface 106 of the body 100 and each of the third and fourth surfaces 103 and 104. Accordingly, the surface insulating layer 620, disposed on the first surface 101 of the body 100 and the internal surface of the first slit portion S1, may cover a vertex region formed by the first surface 101, the third surface 103, and the fifth surface 105 of the body 100, a vertex region formed by the first surface 101, the fourth surface 104, and the fifth surface 105 of the body 100, a vertex region formed by the internal surface of the first slit portion S1 and the third surface 103 and the sixth surface 106 of the body 100, and a vertex region formed by the internal surface of the slit portion S1 and the fourth surface 104 and the sixth surface of the body 100. In general, there is high probability that cracking is present on a corner and a vertex, boundaries between surfaces of a body, due to concentration of stress and there is high probability that magnetic metal powder particles, conductive particles, are exposed. The cracking and the exposed magnetic metal powder particles may serve as a leakage current transmission path, and may cause short-circuit between external electrodes of a component to deteriorate characteristics of the component. In the present embodiment, since the surface insulating layer 620 extends onto at least a portion of each of the third to sixth surfaces 103, 104, 105, and 106 of the body 100 to have a greatest length on a corner between surfaces, the above-described issue may be addressed.

Thus, the coil component 1000 according to the present embodiment may form only a relatively simple insulating structure in the body 100 on which the slit portions S1 and S2 are formed, and thus, may increase an effective volume of a magnetic material, as compared with the same component size. As a result, component characteristics such as inductance, and the like, may be improved.

Figure 9:
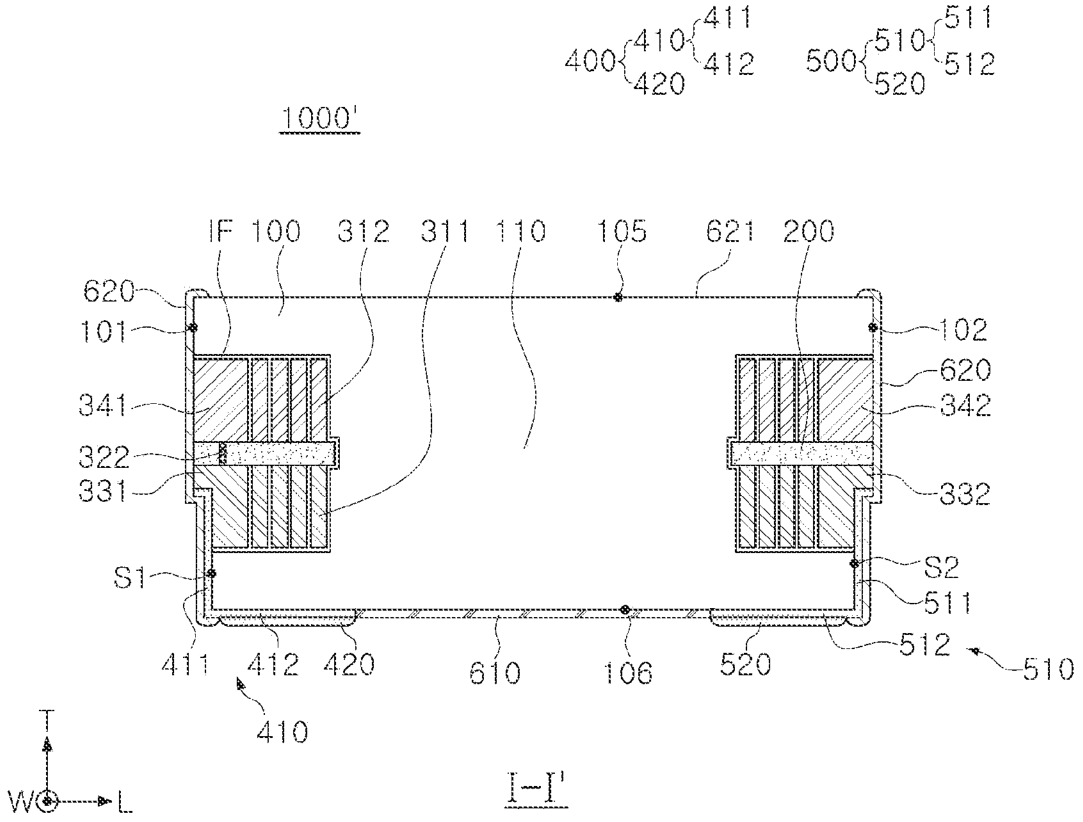
FIGS. 9 and 10 are views, respectively illustrating modified examples of the coil component according to the first embodiment of the present disclosure and respectively corresponding to FIGS. 6 and 7.
Figure 10:
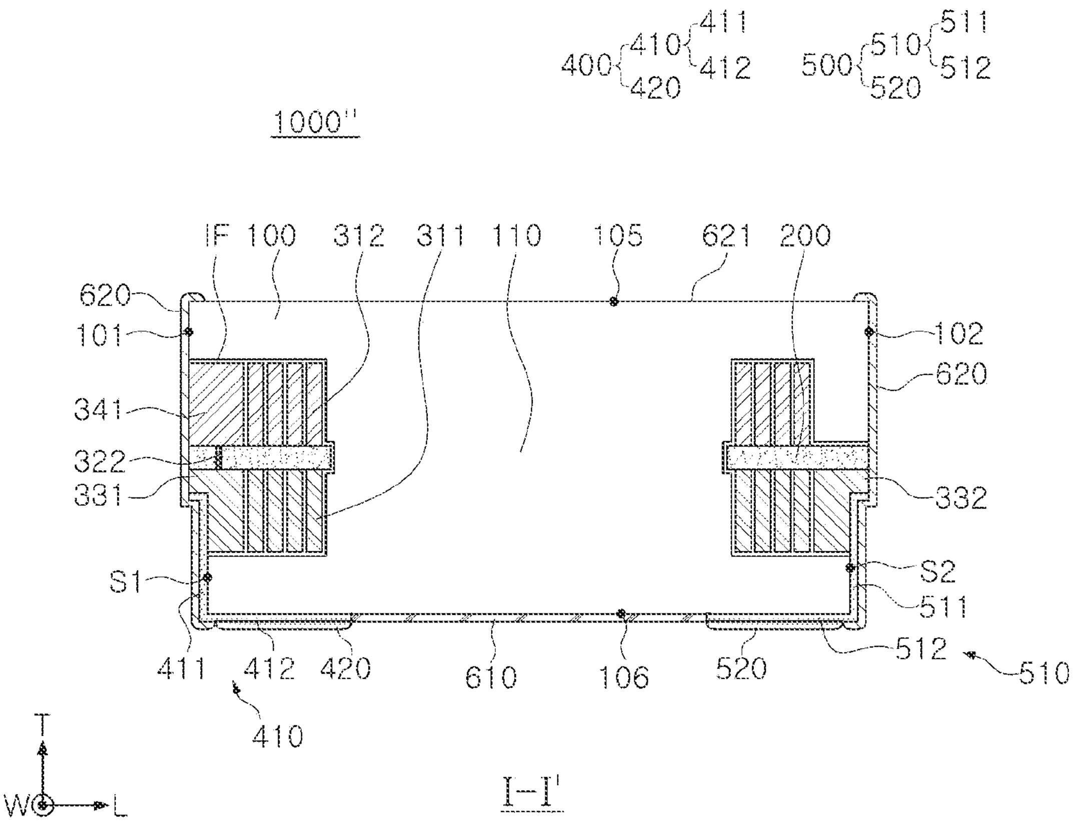

FIGS. 9 and 10 are views, respectively illustrating modified examples of the coil component according to the first embodiment and respectively corresponding to FIGS. 6 and 7.

Referring to FIG. 9, in one modified example of the first embodiment, the above-described third via 323 may be omitted. For example, referring to FIG. 8, a second sub-lead-out pattern 342 is a configuration having no relation to electrical connection between a coil portion 300 and external electrodes 400 and 500, so that a third via 323 for connection between a second lead-out pattern and a second sub-lead-out pattern 342 may be omitted in the present modified example. In the present modified example, since the second sub-lead-out pattern 342 is not omitted, warpage of a support substrate 200 may be significantly reduced during a process.

Referring to FIG. 10, in another modified example of the first embodiment, similarly to the modified example illustrated in FIG. 9, a third via 323 may be omitted and, in addition, a second sub-lead-out pattern 342 may be omitted. In the present modified example, an effective volume of a magnetic material of a body 100 may be increased by a volume corresponding to a volume of the second sub-lead-out pattern 342.

Second Embodiment

Figure 11:
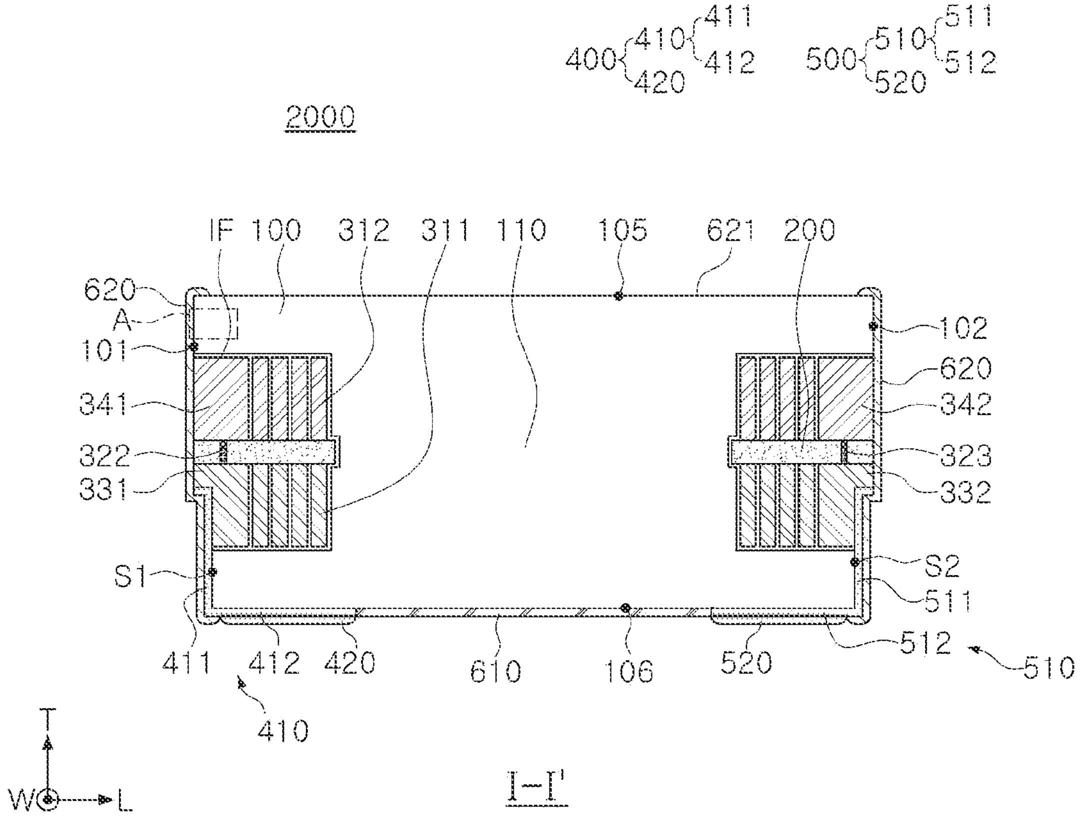
FIGS. 11 and 12 are views illustrating the coil component according to the coil component according to the second embodiment of the present disclosure and respectively corresponding to FIGS. 6 and 7.
Figure 12:
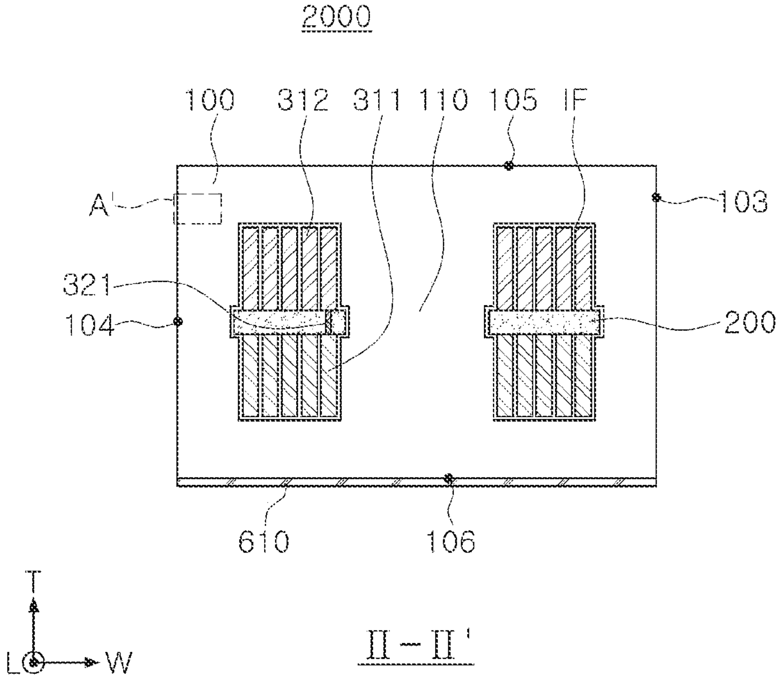
Figure 13:
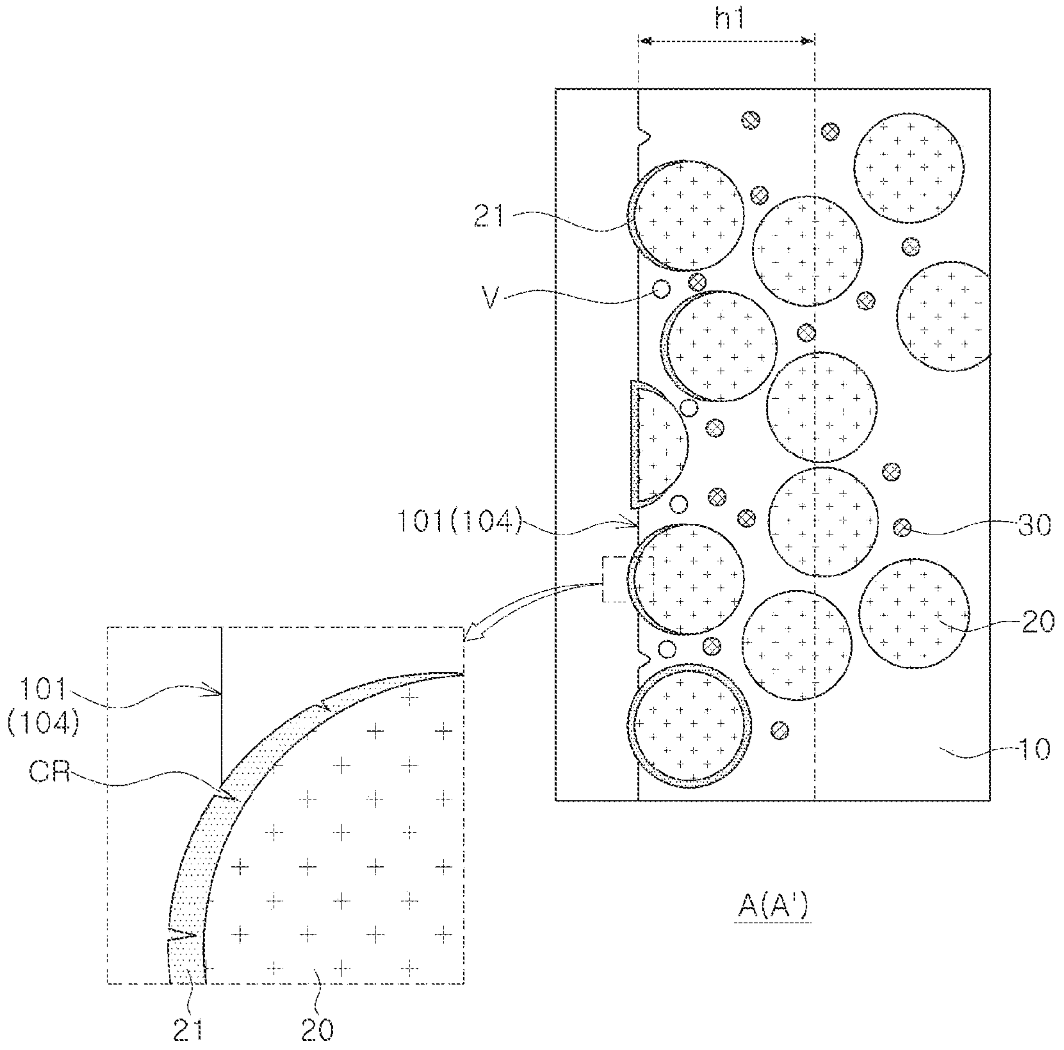
FIG. 13 is an enlarged view of portion A of FIG. 11 and portion A' of FIG. 12.

FIGS. 11 and 12 are views illustrating the coil component according to the coil component according to the second embodiment and respectively corresponding to FIGS. 6 and 7. FIG. 13 is an enlarged view of portion A of FIG. 11 and portion A' of FIG. 12.

Referring to FIGS. 1 to 8 and FIGS. 11 to 13, a coil component 2000 according to a second embodiment is different in a body 100 from the coil component 1000 according to the first embodiment. Therefore, the second embodiment will be described while focusing on only the body 100, a difference from the first embodiment. The descriptions of the first embodiment may be equivalently applied to the other components of the second embodiment. In addition, the modified examples described in the first embodiment may be equivalently applied to the second embodiment.

When comparing FIGS. 1 to 8 with FIGS. 11 to 13, in the present embodiment, the body 100 may include magnetic metal powder particles 20 and 30 and an insulating resin 10, and may include an oxide insulating layer 21 formed on surfaces of the magnetic metal powder particles 20 and 30 exposed to the body 100.

The magnetic metal powder particles 20 and 30 may include one or more selected from the group consisting of iron (Fe), silicon (S1), chromium (Cr), cobalt (Co), molybdenum (Mo), aluminum (Al), niobium (Nb), copper (Cu), and nickel (Ni). For example, the magnetic metal powder particles 20 and 30 may be at least one or more of a pure iron powder, a Fe—Si-based alloy powder, a Fe—Si—Al-based alloy powder, a Fe—Ni-based alloy powder, a Fe—Ni—Mo-based alloy powder, a Fe—Ni—Mo—Cu-based alloy powder, a Fe—Co-based alloy powder, a Fe—Ni—Co-based alloy powder, a Fe—Cr-based alloy powder, a Fe—Cr—Si-based alloy powder, a Fe—Si—Cu—Nb-based alloy powder, a Fe—Ni—Cr-based alloy powder, and a Fe—Cr—Al-based alloy powder.

The magnetic metal powder particles 20 and 30 may be amorphous or crystalline. For example, each of the magnetic metal powder particles 20 and 30 may include a Fe—Si—B—Cr-based amorphous alloy powder, but the present disclosure is not limited thereto. Each of the magnetic metal powder particles 20 and 30 may have an average diameter of about 0.1 μm to 30 μm, but the present disclosure is not limited thereto.

The metal magnetic powder particles 20 and 30 may include a first powder particle 20 and a second powder particle 30 having a smaller diameter than the first powder particle 20, respectively. In the present specification, the term “diameter” may refer to a diameter distribution expressed by D90 or D50. In the case of the present invention, the metal magnetic powder particles 20 and 30 include the first powder particle 20 and the second powder particle 30 having a smaller diameter than the first powder particle 20, respectively, so that the second powder particle 30 may be disposed in a space between the first powder particles 20. As a result, a filling ratio of a magnetic material in the body 100 may be increased. Hereinafter, for ease of description, a description will be provided as to a case in which the metal magnetic powder particles 20 and 30 of the body 100 include the first powder particle 20 and the second powder particle 30 having different diameters. However, the scope of the present disclosure is not limited thereto. As another non-limiting example of the present disclosure, magnetic metal powder particles may include three types of powder particles having different diameters. An insulating coating layer may be formed on the surfaces of the magnetic metal powder particles 20 and 30, but the present disclosure is not limited thereto.

The oxide insulating layer 21 may be formed on the surfaces of the metal magnetic powder particles 20 and 30, exposed to at least one of first to fifth surfaces 101, 102, 103, 104, 105 of the body 100, and may include metal ingredients of the magnetic metal powder particles 20 and 30. The magnetic metal powder particles 20 and 30 may be exposed to the first to fifth surfaces 101, 102, 103, 104, and 105 of the body 100 by a full dicing process of individualizing a coil bar. Each of the first to fourth surfaces 101, 102, 103, and 104 of the body 100 may correspond to a cut surface in the full dicing process. The magnetic metal powder particles 20 and 30 present throughout a dicing line may be cut, and thus, the cut surfaces may be exposed to the first to fourth surfaces 101, 102, 103, and 104 of the body 100. In the present embodiment, an acid treatment may be performed on the first to fifth surfaces 101, 102, 103, 104, 105 of the body 100 to form an oxide insulating layer 21 on each of the magnetic metal powder particles exposed to the first to fifth surfaces 101, 102, 103, 104 and 105. In this case, since an acid treatment solution selectively reacts with the exposed magnetic metal powder particles 20 and 30 to form the oxide insulating layer 21, the oxide insulating layer 21 may include metal ingredients of the exposed metal magnetic powder 20 and 30. The oxide insulating layer 21 may be formed on the first to fifth surfaces 101, 102, 103, 104, 105 of the body 100 through the acid treatment to decrease the number of processes, as compared to a case in which an additional patterned insulating layer is formed on each of the first to fifth surfaces 101, 102, 103, 104, and 105 of the body 100.

Due to a relatively porous structure of a cured product of the insulating resin 10 of the body 100, the acid treatment solution may permeate through the first to fifth surfaces 101, 102, 103, 104, and 105 of the body 100 to a predetermined depth hl. As a result, the oxide insulating layer 21 may have a surface formed on the magnetic metal powder particles 20 and 30, exposed to the first to fifth surfaces 101, 102, 103, 104, and 105 of the body 100, as well as at least a portion of the magnetic metal powder particles 20 and 30 unexposed to the first to fifth surfaces 101, 102, 103, 104, and 105 of the body 100 but disposed within a predetermined depth from the first to fifth surfaces 101, 102, 103, 104, and 105 of the body 100. The predetermined depth from the first to fifth surfaces 101, 102, 103, 104, and 105 of the body 100 may be defined as a depth of about 1.5 times the diameter of the first powder particle 20.

Since the diameter of the first powder particle 20 is greater than the diameter of the second powder particle 30, the oxide insulating layer 21 may be generally formed on the surface of the first powder particle 20. For example, both the first powder particle 20 and the second powder particle 30 may be disposed within a predetermined depth from the first to fifth surfaces 101, 102, 103, 104, 105 of the body 100, but the second powder particle 30 may be dissolved in the acid treatment solution during the acid treatment due to a relatively small size of the second powder particle 30. The second powder particle 30 may be dissolved in the acid treatment solution to form a void V in a region within a predetermined depth from the first to fifth surfaces 101, 102, 103, 104, and 105 of the body 100. As a result, a void V corresponding to a volume of the second powder particle 30 may remain in the insulating resin 10 disposed within the predetermined depth from the first to fifth surfaces 101, 102, 103, 104, and 105 of the body 100. As described above, since the diameter of the second powder particle 30 refers to a diameter depending on a diameter distribution, a volume of the second powder particle 30 may also refer to a volume distribution. Therefore, the sentence "the volume of the void V corresponds to the volume of the second powder particle 30" may mean that a volume distribution of the void V is substantially the same as the volume distribution of the second powder particle 30.

The oxide insulating layer 21 may be formed by exposing at least a portion of a surface thereof to the surface of the body 100 or allowing the magnetic metal powder particles 20 and 30, disposed within the predetermined depth from the surface of the body, to react with acid. Accordingly, the oxide insulating layer 21 may be discontinuously formed on the surface of the body 100. In addition, a concentration of oxygen in the oxide insulating layer 21 may be decreased in a direction toward an external side of each of the magnetic metal powder particles 20 and 30 from an internal side thereof. For example, since the surfaces of the magnetic metal powder particles 20 and 30 are exposed to the acid treatment solution for longer than the internal sides of the magnetic metal powder particles 20 and 30, the concentration of oxygen in the oxide insulating layer 21 may vary depending on a depth of the oxide insulating layer 21. As a result, cracking CR may occur in the oxide insulating layer 21 due to an imbalance of a metal ingredient, or the like, caused by an oxidation-reduction reaction. For the above reasons, the oxide insulating layer 21 of the present disclosure is distinguished from a technique to apply or coat an additional oxide layer on the magnetic metal powder particles 20 and 30.

As illustrated in FIG. 13, the oxide insulating layer 21 may be formed on entire surfaces of the magnetic metal powder particles 20 and 30 or only one region of the surfaces of the magnetic metal powder particles 20 and 30, based on one of the magnetic metal powder particles 20 and 30 disposed within the predetermined depth from the first surface 101 or the fourth surface 104 of the body 100.

The magnetic metal powder particles 20 and 30) may also be exposed to the internal walls of the slit portions S1 and S2, and the above-mentioned acid treatment process may also be performed on the internal walls of the slit portions S1 and S2. Therefore, the oxide insulating layer 21 may also be formed on the magnetic metal powder particles 20 and 30 exposed to the internal walls of the slit portions S1 and S2.

Third Embodiment

Figure 14:
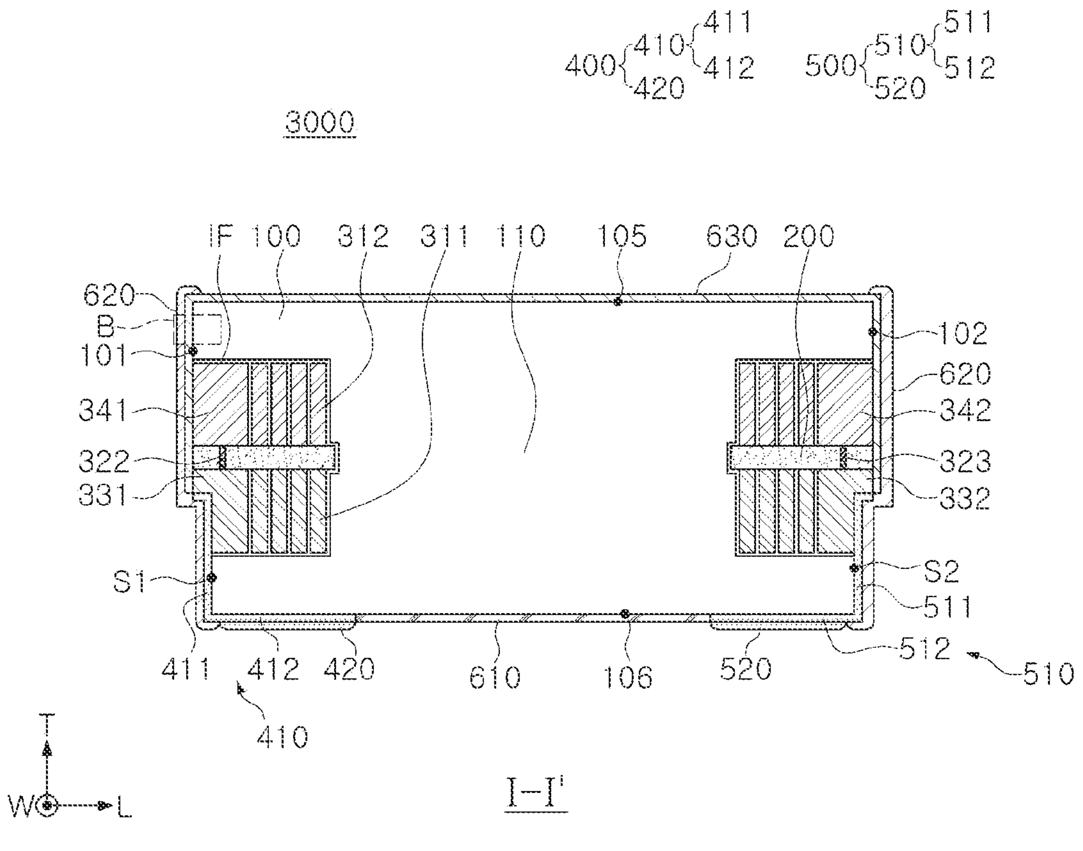
FIGS. 14 and 15 are views illustrating a coil component according to a third embodiment of the present disclosure and respectively corresponding to FIGS. 6 and 7.
Figure 15:
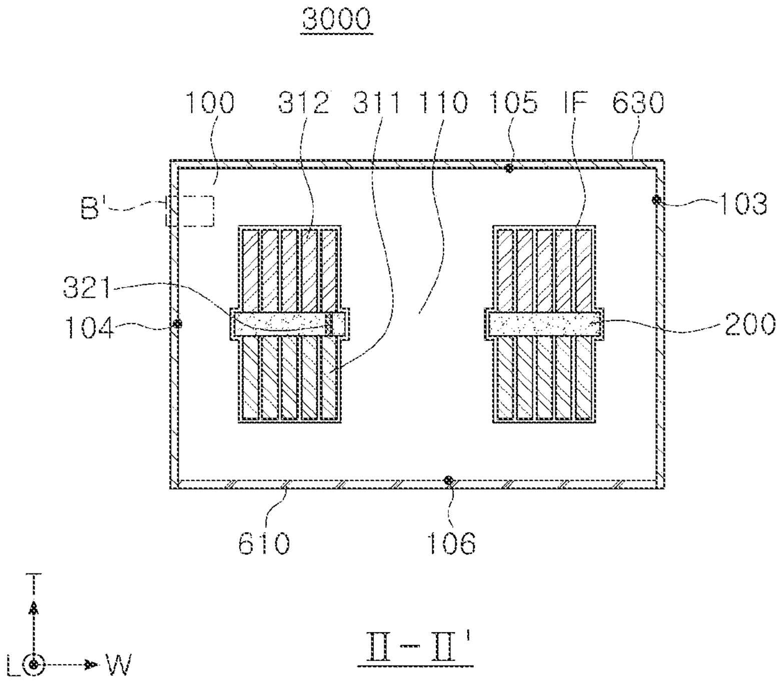
Figure 16:
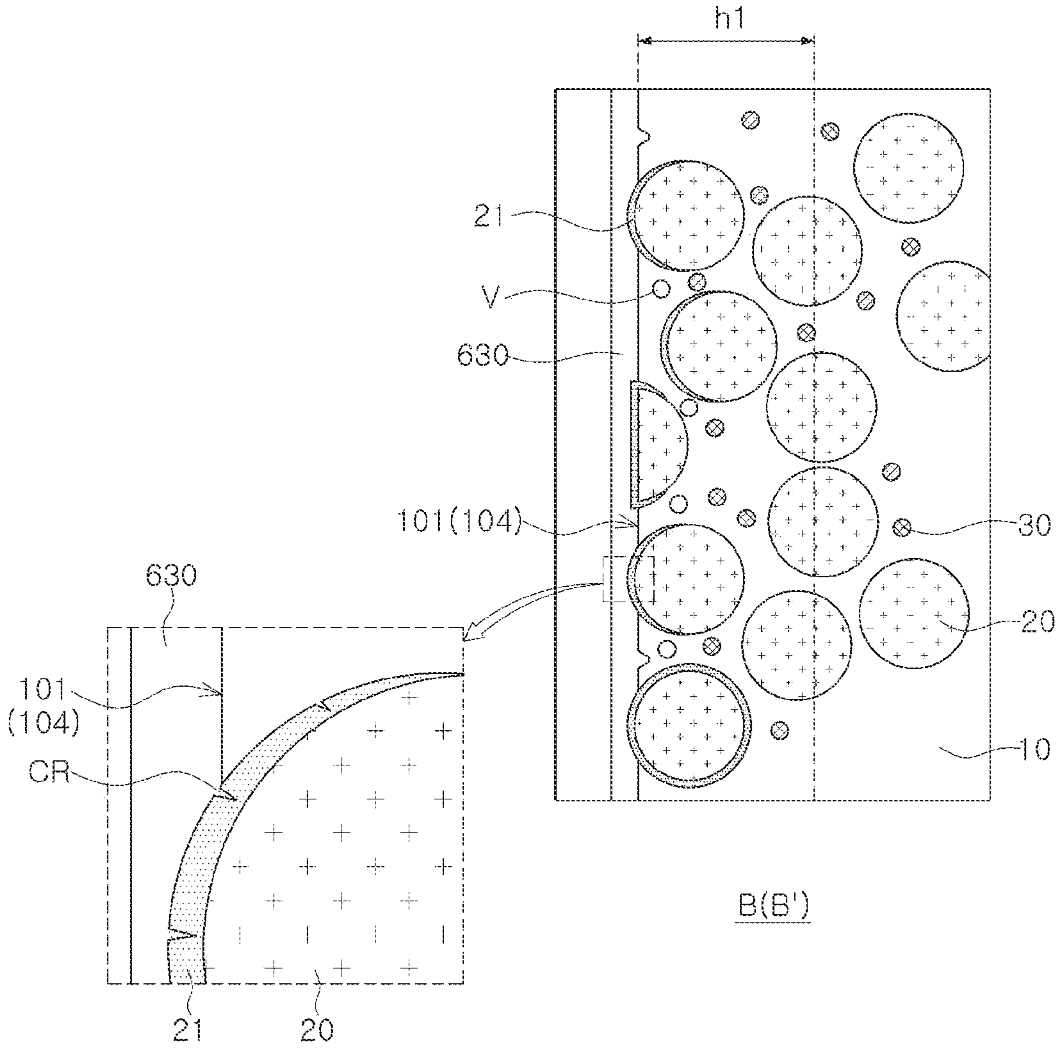
FIG. 16 is an enlarged view of portion B of FIG. 14 and portion B' of FIG. 15.

FIGS. 14 and 15 are views illustrating a coil component according to a third embodiment and respectively corresponding to FIGS. 6 and 7. FIG. 16 is an enlarged view of portion B of FIG. 14 and portion B' of FIG. 15.

Referring to FIGS. 1 to 8, FIGS. 11 to 13, and FIGS. 14 to 16, a coil component 3000 according to the third embodiment may further include a cover insulating layer 630, as compared with the coil component 200 according to the second embodiment. Therefore, the second embodiment will be described while only focusing on the cover insulating layer 630, a difference from the second embodiment. The descriptions of the first and second embodiments may be equivalently applied to the other components of the third embodiment. In addition, the modified examples described in the first embodiment may be equivalently applied to the third embodiment.

When comparing FIGS. 11 to 13 with FIGS. 14 to 16, the cover insulating layer 630 may be further provided in the present embodiment.

The cover insulating layer 630 may be disposed on first to fifth surfaces 101, 102, 103, 104, and 105 of a body 100. The cover insulating layer 630 may not extend onto internal walls of slit portions S1 and S2 and a lower insulating layer 610 disposed on a sixth surface 106 of the body 100. In this case, the cover insulating layer 630 may serve as a mask together with the lower insulating layer 610 when first metal layers 410 and 510 of external electrodes 400 and 500 are selectively formed on the body 100. Accordingly, the cover insulating layer 630 may be formed in a process between a process of forming the lower insulation layer 610 and a process of forming the first metal layers 410 and 510 of the external electrodes 400 and 500. The cover insulating layer 630 is in contact with each of the first to fifth surfaces 101, 102, 103, 104, and 105 of the body 100. A process of forming the cover insulating layer 630 may be performed after a process of individualizing a coil bar is finished. Since the cover insulating layer 630 is formed ahead of the surface insulating layer 620, the cover insulating layer 630 may be disposed between each of the first and second surfaces 101 and 102 of the body 100 and the surface insulating layer 620.

The cover insulating layer 630 may include a thermoplastic resin such as a polystyrene-based resin, a vinyl-acetate-based resin, a polyester-based resin, a polyethylene-based resin, a polypropylene-based resin, a polyamide-based resin, a rubber-based resin, or an acrylic-based resin, a thermosetting resin such as a phenol-based resin, an epoxy-based resin, a urethane-based resin, a melamine-based resin, or an alkyd-based resin, a photosensitive resin, parylene, $SiO_x$, or $SiN_x$. The cover insulating layer 630 may further include an insulating filler such as an inorganic filler, but the present disclosure is not limited thereto.

As described above, characteristics of a coil component may be improved.

In addition, a lower-surface electrode structure of a coil component may be easily formed.

While exemplary embodiments have been shown and described above, it will be apparent to those skilled in the art that modifications and variations could be made without departing from the scope of the present disclosure as defined by the appended claims.

What is claimed is:

1. A coil component comprising:

a body having a first surface, and a first end surface and a second end surface, each connected to the first surface of the body and opposing each other in a length direction;

a support substrate disposed in the body;

a coil portion comprising a first coil pattern, a first lead-out pattern, and a second lead-out pattern, each disposed on a first surface of the support substrate facing the first surface of the body;

a first slit portion defined at a corner portion of the body between the first end surface and the first surface of the body, and a second slit portion defined at a corner portion of the body between the second end surface of the body and the first surface of the body, the first and second slit portions respectively exposing the first and second lead-out patterns to an outside of the body;

a first external electrode and a second external electrode disposed to be spaced apart from each other on the first surface of the body, and respectively extending onto the first and second slit portions to be connected to the first and second lead-out patterns; and a surface insulating layer disposed on each of the first and second slit portions to cover at least a portion of the first and second external electrodes and extending onto a portion of the first surface of the body, wherein the surface insulating layer covers each of the first end surface and the second end surface of the body, the body further has a second surface, opposing the first surface of the body, and a first side surface and a second side surface, connecting the first end surface and the second end surface of the body to each other and opposing each other, and a length of a region of the surface insulating layer, extending onto the portion of the first surface of the body, is greatest on a corner portion between the first surface of the body and each of the first side surface and the second side surface of the body, among all lengths of the region in the length direction.

2. The coil component of claim 1, wherein the surface insulating layer further extends onto at least a portion of each of the second surface of the body and the first and second side surfaces of the body.

3. The coil component of claim 1, wherein the first and second external electrodes comprise first and second connection portions, disposed on the first and second slit portions to be in contact with the first and second lead-out patterns, respectively, and spaced apart from each of the first side surface and the second side surface of the body, and further comprise first and second pad portions, respectively, disposed on the first surface of the body, and the surface insulating layer covers each of the first and second connection portions.

4. The coil component of claim 3, further comprising:

a lower insulating layer disposed on the first surface of the body to expose the first and second pad portions, wherein the surface insulating layer extends onto the lower insulating layer to cover at least a portion of each of the first and second pad portions.

5. The coil component of claim 4, wherein the first and second pad portions are spaced apart from each of the first side surface and the second side surface of the body, and at least one of distances from the first side surface and the second side surface of the body to the first and second pad portions is greater than at least one of distances from the first side surface and the second side surface of the body to the first and second connection portions.

6. The coil component of claim 1, wherein the body comprises a magnetic metal powder particle and an insulating resin, and wherein the coil component further comprises an oxide insulating layer disposed on a surface of the magnetic metal powder particle, exposed to at least one of the second surface, the first end surface, the second end surface, the first side surface, and the second side surface, and including a metal ingredient of the magnetic metal powder particle.

7. The coil component of claim 6, wherein concentration of oxygen in the oxide insulating layer is decreased in a direction toward an internal side of the magnetic metal powder particle.

8. The coil component of claim 6, further comprising:

a cover insulating layer covering the second surface, the first end surface, the second end surface, the first side surface, and the second side surface of the body, wherein the cover insulating layer is disposed between each of the first end surface and the second end surface of the body and the surface insulating layer.

9. The coil component of claim 1, wherein the coil portion comprises:

a second coil pattern and a first sub-lead-out pattern disposed to be in contact with each other on a second surface of the support substrate opposing the first surface of the support substrate;

a first via penetrating through the support substrate to connect internal end portions of each of the first and second coil patterns to each other; and a second via penetrating through the support substrate to connect the second lead-out pattern and the first sub-lead-out pattern to each other.

10. The coil component of claim 9, wherein the coil portion further comprises:

a second sub-lead-out pattern disposed to be spaced apart from each of the second coil pattern and the first sub-lead-out pattern on the second surface of the support substrate.

11. The coil component of claim 10, wherein the coil portion further comprises:

a third via penetrating through the support substrate to connect the second lead-out pattern and the second sub-lead-out pattern to each other.

12. A coil component comprising:

a body having a first surface, and a first end surface and a second end surface, each connected to the first surface of the body and opposing each other in a length direction;

a support substrate disposed in the body;

a coil portion comprising a first coil pattern, a first lead-out pattern, and a second lead-out pattern, each disposed on a first surface of the support substrate facing the first surface of the body;

a first slit portion defined at a corner portion of the body between the first end surface and the first surface of the body, and a second slit portion defined at a corner portion of the body between the second end surface of the body and the first surface of the body, the first and second slit portions respectively, wherein the first and second lead-out patterns have grooves sharing surfaces with internal surfaces of the first and second slit portions, respectively;

a first external electrode and a second external electrode disposed to be spaced apart from each other on the first surface of the body, and respectively extending onto the first and second slit portions to be connected to the first and second lead-out patterns; and a surface insulating layer disposed on each of the first and second slit portions to cover at least a portion of the first and second external electrodes, wherein the surface insulating layer extends an entire region of each of the first and second end surfaces, and the surface insulating layer partially extends onto four surfaces connected to each of the first and second end surfaces.

13. The coil component of claim 12, wherein the body further has a second surface, opposing the first surface of the body, and a first side surface and a second side surface, connecting the first end surface and the second end surface of the body to each other and opposing each other, and a length of a region of the surface insulating layer, extending onto the portion of the first surface of the body, is greatest on a corner portion between the first surface of the body and each of the first side surface and the second side surface of the body, among all lengths of the region in the length direction.

14. The coil component of claim 13, further comprising:

a cover insulating layer covering the second surface, the first end surface, the second end surface, the first side surface, and the second side surface of the body, wherein the cover insulating layer is disposed between each of the first end surface and the second end surface of the body and the surface insulating layer.

15. The coil component of claim 12, wherein the body further has a second surface, opposing the first surface of the body in a thickness direction, and a first side surface and a second side surface, connecting the first end surface and the second end surface of the body to each other and opposing each other in a width direction, the coil component further comprises a cover insulating layer covering the second surface, the first end surface, the second end surface, the first side surface, and the second side surface of the body, and the cover insulating layer is disposed between each of the first end surface and the second end surface of the body and the surface insulating layer.

16. The coil component of claim 12, further comprising:

a lower insulating layer disposed on the first surface of the body to expose portions of the first and second external electrodes, wherein the surface insulating layer further extends onto at least a portion of the lower insulating layer to cover at least a portion of each of the first and second external electrodes disposed on the first surface of the body.

17. A coil component comprising:

a body having a first surface, and a first end surface and a second end surface, each connected to the first surface of the body and opposing each other in a length direction;

a support substrate disposed in the body;

a coil portion comprising a first coil pattern, a first lead-out pattern, and a second lead-out pattern, each disposed on a first surface of the support substrate facing the first surface of the body;

a first slit portion defined at a corner portion of the body between the first end surface and the first surface of the body, and a second slit portion defined at a corner portion of the body between the second end surface of the body and the first surface of the body, the first and second slit portions respectively exposing the first and second lead-out patterns to an outside of the body;

a first external electrode and a second external electrode disposed to be spaced apart from each other on the first surface of the body, and respectively extending onto the first and second slit portions to be connected to the first and second lead-out patterns; and a surface insulating layer disposed on each of the first and second slit portions to cover at least a portion of the first and second external electrodes and extending onto a portion of the first surface of the body, wherein the first lead-out pattern includes two surfaces facing the first end surface and the first surface of the body, respectively, and exposed by the first slit portion, and the second lead-out pattern includes two surfaces facing the second end surface and the first surface of the body, respectively, and exposed by the second slit portion.

* * * * *